(12) United States Patent
Arun

(10) Patent No.: US 10,042,672 B2
(45) Date of Patent: Aug. 7, 2018

(54) SYSTEMS AND METHODS FOR RECONSTRUCTING 3-DIMENSIONAL MODEL BASED ON VERTICES

(71) Applicant: Live Planet LLC, Los Angeles, CA (US)

(72) Inventor: Rohan Maroly kovumal Arun, Calabasas, CA (US)

(73) Assignee: Live Planet LLC, Los Angeles, CA (US)

( * ) Notice: Subject to any disclaimer, the term of this patent is extended or adjusted under 35 U.S.C. 154(b) by 0 days.

(21) Appl. No.: 14/557,238

(22) Filed: Dec. 1, 2014

(65) Prior Publication Data

US 2015/0262420 A1 Sep. 17, 2015

Related U.S. Application Data

(60) Provisional application No. 61/952,055, filed on Mar. 12, 2014.

(51) Int. Cl.
| | |
|---|---|
| *G06T 15/00* | (2011.01) |
| *G06F 9/48* | (2006.01) |
| *G06T 1/20* | (2006.01) |
| *H04L 29/08* | (2006.01) |
| *G06F 3/14* | (2006.01) |
| *G06T 15/08* | (2011.01) |

(Continued)

(52) U.S. Cl.
CPC .......... *G06F 9/4881* (2013.01); *G06F 3/1438* (2013.01); *G06F 3/1446* (2013.01); *G06F 3/1454* (2013.01); *G06F 9/445* (2013.01); *G06T 1/20* (2013.01); *G06T 15/005* (2013.01); *G06T 15/08* (2013.01); *G06T 17/10* (2013.01); *H04L 67/1002* (2013.01); *G06T 2200/16* (2013.01); *G06T 2207/10024* (2013.01); *G06T 2210/52* (2013.01)

(58) Field of Classification Search
CPC ....... G06T 7/0067; G06T 15/20; G06T 17/00; G06T 17/20; G06T 17/10; G06T 15/40; G06T 7/0065; G06T 17/05; G06T 7/174; G06T 7/579; G06T 2207/10016
USPC ......................................... 345/419, 420, 421
See application file for complete search history.

(56) References Cited

U.S. PATENT DOCUMENTS

| | | | |
|---|---|---|---|
| 5,850,352 A | 12/1998 | Moezzi et al. | |
| 7,755,631 B1 * | 7/2010 | Mrazek | G06T 1/00 345/501 |

(Continued)

OTHER PUBLICATIONS

Cornou, S., M. Dhome, and P. Sayd. "Building reconstruction from N uncalibrated views." International Archives of Photogrammetry Remote Sensing and Spatial Information Sciences 34.5/W12 (2003): 127-132.*

(Continued)

*Primary Examiner* — Phu K Nguyen
(74) *Attorney, Agent, or Firm* — Foley & Lardner LLP

(57) ABSTRACT

Systems and methods are described for reconstructing a 3-dimensional model of a target space, including, but not limited to: partitioning a model of a target space into a plurality of vertices; determining at least one display attribute associated with each of the plurality of vertices based on output data observed by a plurality of data sources; and selecting one of the at least one display attribute for each of the plurality of vertices.

26 Claims, 20 Drawing Sheets

(51) Int. Cl.
*G06T 17/10* (2006.01)
*G06F 9/445* (2018.01)

(56) References Cited

U.S. PATENT DOCUMENTS

| | | | | |
|---|---|---|---|---|
| 7,777,741 | B2* | 8/2010 | Teler | G06T 15/40 |
| | | | | 345/421 |
| 7,928,989 | B1* | 4/2011 | Brown | G06T 15/04 |
| | | | | 345/501 |
| 8,117,011 | B2* | 2/2012 | Ravnikar | G06F 17/50 |
| | | | | 345/419 |
| 8,380,465 | B2* | 2/2013 | Ravnikar | G06F 17/50 |
| | | | | 345/419 |
| 8,655,052 | B2* | 2/2014 | Spooner | G06T 7/0065 |
| | | | | 345/419 |
| 8,798,965 | B2* | 8/2014 | Quan | G06T 7/0071 |
| | | | | 345/419 |
| 8,917,282 | B2* | 12/2014 | DiVerdi | G06T 11/203 |
| | | | | 345/589 |
| 9,087,401 | B1* | 7/2015 | Zheng | G06T 15/205 |
| 9,417,911 | B2* | 8/2016 | Arun | G06F 9/4881 |
| 9,516,222 | B2* | 12/2016 | Duparre | H04N 5/23238 |
| 2002/0015055 | A1 | 2/2002 | Foran | |
| 2004/0217956 | A1 | 11/2004 | Besl et al. | |
| 2005/0041031 | A1 | 2/2005 | Diard | |
| 2005/0052452 | A1 | 3/2005 | Baumberg | |
| 2005/0185823 | A1 | 8/2005 | Brown et al. | |
| 2006/0044313 | A1 | 3/2006 | Lake et al. | |
| 2006/0221073 | A1 | 10/2006 | Teler et al. | |
| 2007/0005795 | A1 | 1/2007 | Gonzalez | |
| 2007/0195099 | A1 | 8/2007 | Diard et al. | |
| 2008/0168135 | A1 | 7/2008 | Redlich et al. | |
| 2009/0002263 | A1 | 1/2009 | Pasetto | |
| 2009/0109219 | A1 | 4/2009 | Decoro et al. | |
| 2009/0135180 | A1 | 5/2009 | Li | |
| 2009/0160866 | A1 | 6/2009 | Pau et al. | |
| 2010/0001995 | A1 | 1/2010 | Hamill et al. | |
| 2010/0141665 | A1 | 6/2010 | Madruga et al. | |
| 2010/0328325 | A1 | 12/2010 | Sevigny et al. | |
| 2011/0115792 | A1 | 5/2011 | Tamaoki | |
| 2011/0145878 | A1 | 6/2011 | Gronning | |
| 2012/0041722 | A1 | 2/2012 | Quan et al. | |
| 2012/0131591 | A1 | 5/2012 | Moorthi et al. | |
| 2013/0038686 | A1 | 2/2013 | Chen et al. | |
| 2014/0040357 | A1 | 2/2014 | McDowell | |
| 2014/0071234 | A1 | 3/2014 | Millett | |

OTHER PUBLICATIONS

Elaksher, A., J. Bethel, and E. Mikhail. "Reconstructing 3d building wireframes from multiple images." International Archives of Photogrammetry Remote Sensing and Spatial Information Sciences 34.3/A (2002): 91-96.*
Rigiroli, Paolo, et al. "Mesh refinement with color attributes." Computers & Graphics 25.3 (2001): 449-461.*
International Search Report and Written Opinion dated Jun. 15, 2015, from related International Application No. PCT/US2015/019531.
International Search Report and Written Opinion dated Jun. 19, 2015, from related International Application No. PCT/US2015/019511.
US Office Action dated Oct. 21, 2015, from related U.S. Appl. No. 14/537,768.
International Search Report and Written Opinion dated Jun. 19, 2015, from related International Application No. PCT/US2015/019525.
US Notice of Allowance dated Jun. 23, 2016, from related U.S. Appl. No. 14/53,7768.
US Office Action dated Apr. 14, 2016, from related U.S. Appl. No. 14/537,768.
International Preliminary Report on Patentability dated Sep. 22, 2016, from related application No. PCT/US2015/019511.
International Preliminary Report on Patentability dated Sep. 22, 2016, from related application No. PCT/US2015/019525.
International Preliminary Report on Patentability dated Sep. 22, 2016, from related application No. PCT/US2015/019531.
US Office Action dated Sep. 2, 2016, from related U.S. Appl. No. 14/618,731.
US Notice of Allowance dated Jan. 31, 2017, from related U.S. Appl. No. 14/618,731.

* cited by examiner

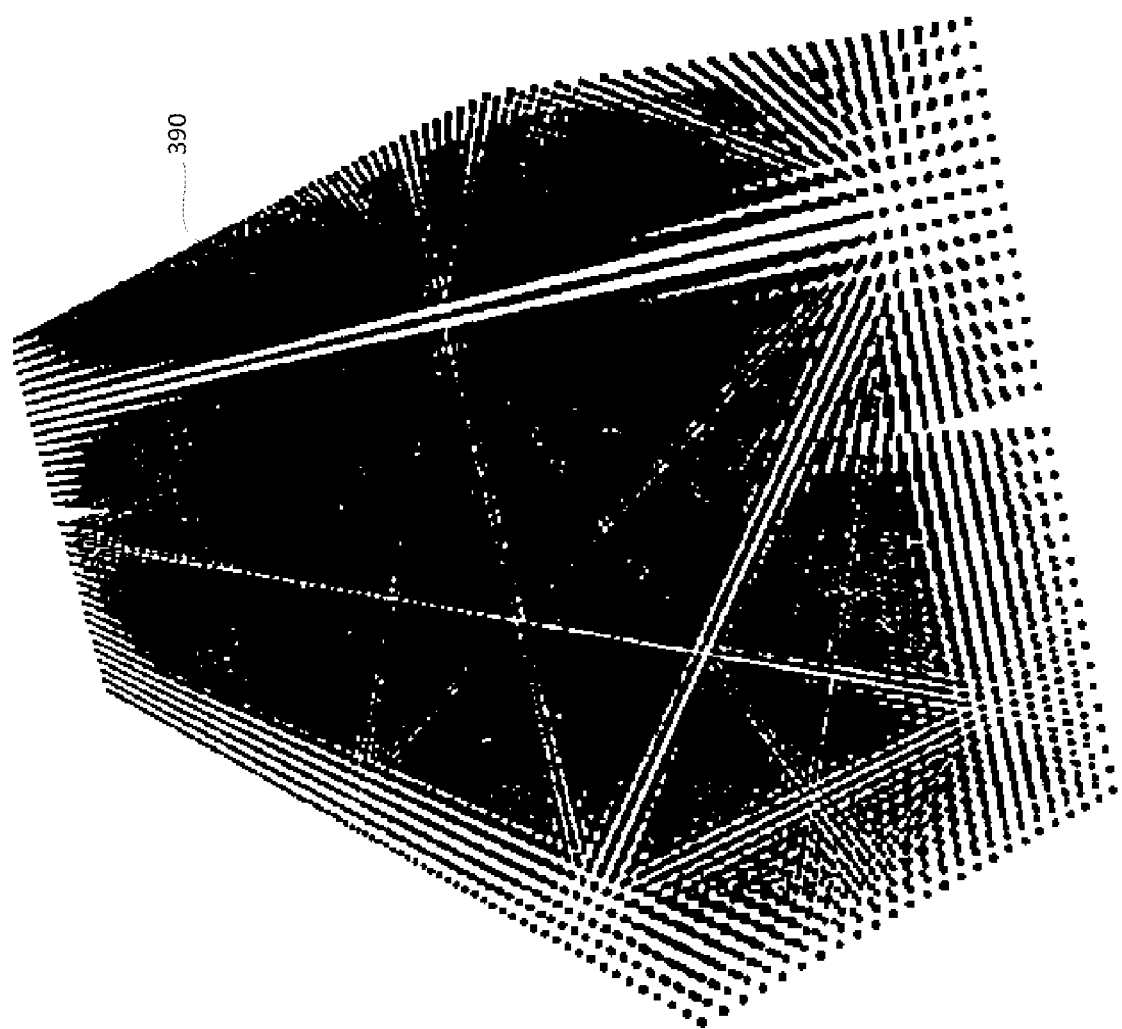

| | Vertex a | Vertex b | Vertex c | Vertex d | ... | Vertex n |
|---|---|---|---|---|---|---|
| Level 1 | Vertex a | Vertex b | Vertex c | Vertex d | ... | Vertex n |
| Level 2 | Vertex a | Vertex b | Vertex c | Vertex d | ... | Vertex n |
| ... | ... | ... | ... | ... | ... | ... |
| Level N | Vertex a | Vertex b | Vertex c | Vertex d | ... | Vertex n |

*FIG. 8B*

| Vertex | Data Source | Projected Position on Frame | Frame Location |
|---|---|---|---|
| Vertex n (x, y, z) | Data Source A | $(\alpha_1, \beta_2)$ | $URL_A$ |
| | Data Source B | N/A | $URL_B$ |
| | ... | ... | ... |
| | Data Source N | $(\alpha_n, \beta_n)$ | $URL_N$ |

| Vertex | Display Attribute (Color) Bin | Weight Bin | Selected Display Attribute Bin |
|---|---|---|---|
| 1 | Color A | 2 | Color A |
| 2 | Color C | 3 | Color C |
| 3 | Color D | 1 | N/A |
|   | Color F | 1 |   |
| 4 | Color A | 2 | Color A |
|   | Color E | 1 |   |
| 5 | Color B | 1 | N/A |
|   | Color D | 1 |   |

1210 → vertex 1 row
1220 → vertex 2 row
1230 → vertex 3 row
1240 → vertex 4 row
1250 → vertex 5 row Display Threshold Weight = 1

*FIG. 12*

SYSTEMS AND METHODS FOR RECONSTRUCTING 3-DIMENSIONAL MODEL BASED ON VERTICES

CROSS-REFERENCE TO RELATED PATENT APPLICATIONS

This application claims priority from Provisional Application U.S. Application 61/952,055, filed Mar. 12, 2014, incorporated herein by reference in its entirety. This application relates to application Ser. No. 14/537,768, titled SYSTEMS AND METHODS FOR SCALABLE ASYNCHRONOUS COMPUTING FRAMEWORK, and filed on Nov. 10, 2014, which is incorporated herein by reference, in its entirety.

BACKGROUND OF THE INVENTION

1. Field of Invention

Present embodiments relate generally to reconstructing and graphically displaying a 3-dimensional space, and more specifically, to reconstructing and graphically displaying the 3-dimensional space based on vertices defined within the 3-dimensional space.

2. Background

Generally, 3-dimensional reconstruction has been a computation-intensive task, especially in a real-time context. Methods for 3-dimensional reconstruction include triangulation, stereo vision, and time of flight systems to extract the 3-dimensional features of objects within a target space in real-time. Computational methods may have considerable potential for growth as compared to sensor-based methods, but require complex searching or matching that consumes a tremendous amount of time and computational resources. For example, both the time of flight method and the video-based stereo vision capture only a single angle. Time of flight is limited in resolution by the sensor used. Though video-based stereo vision can operate outdoors, stereo vision relies on computation-intensive searching to generate outputs. Therefore, disadvantages associated with methods described above may include errors and inefficiencies caused by either too much or too little information.

Three-dimensional space reconstruction based on outputs from cameras is becoming increasingly valuable for entertainment, security, medicine, movie production, and the like. Due to the fact that most live 3-dimensional scanners have limited range, resolution, and outdoors capabilities, computer vision researchers have sought algorithmic solutions. Algorithmic photo-based methods to derive 3-dimensional geometry in real time have drawbacks due to the similarity between textures in input to the algorithms as well as the overabundance of data to be processed. Most algorithmic methods perform approximations or tricks to avoid processing all of the data required in order to increase speed of execution. As such, data that would be necessary for an ideal solution may be disregarded, yet on the other hand, ideal photo-realistic solutions typically require processing of a tremendous amount of data to execute well enough quality.

Therefore, cost-effective systems and methods to build a 3-dimensional model of a target space and to reconstruct the 3-dimensional model at devices of end-users are desired.

SUMMARY OF THE DISCLOSURE

Embodiments described herein relate to systems and methods for capturing, building, and reconstructing a 3-dimensional model of a target space. In particular, the systems and methods can be implemented to capture, build, and reconstruct the 3-dimensional model (e.g., including mobile and immobile objects within the target space) in real-time (e.g., as in the cases of live broadcasts and/or streams of events that last for more than a moment in time).

In particular, the target (3-dimensional) space may be partitioned to include a plurality of vertices, each vertex may be associated with a discrete volume within the target space. Data (e.g., image data, video data, and/or the like) relating to the target space may be captured by data sources (e.g., cameras). Each image or frame of a video may capture a plurality of areas. For example, each area (a fraction of a pixel or at least one pixel) may be associated with one of the plurality of vertices defined within the target space.

For each vertex, display characteristics may be assessed based on the images/video frames captured by the data sources. The display characteristics include, but are not limited to, colors, textures, frequency transforms, wavelet transforms, averages, standard deviations, a combination thereof, and/or the like. Each display characteristic may be represented in at least one display attribute. With respect to a single image/frame as captured by a single source device, display attributes associated with each of the vertices may be captured and processed. In particular, a weight for each display attribute may be determined based on the display attribute associated with the area (e.g., the fraction of a pixel or at least one pixel) of the captured image/or frame. Given that there are a plurality of data sources capturing the target space at the same time in different camera poses, a plurality of display attributes associated with a given vertex may be captured.

Objects within the target space may block or contain a given vertex. As at least one potential display attribute and weights associated therewith has been obtained, the selected display attribute may be set as one of the potential display attributes (e.g., at least one potential display attribute) that is associated with the highest level of confidence. The level of confidence may be based on predetermined threshold, comparison with weights of other display attribute(s), standard deviations, averages, convolution of surrounding pixels, a combination thereof, and/or the like.

In some embodiments, a method may be described herein, the method includes, but not limited to: partitioning a model of a target space into a plurality of vertices; determining at least one display attribute associated with each of the plurality of vertices based on output data provided by a plurality of data sources; and selecting one of the at least one display attribute for each of the plurality of vertices.

In some embodiments, the method further includes providing a plurality of data sources. Each of the plurality of data sources output data corresponding to a current frame as the output data comprising a plurality of areas.

In some embodiments, each of the plurality of areas corresponds to one of the plurality of vertices.

In various embodiments, determining the at least one display attribute associated with each of the plurality of vertices comprises determining a display attribute associated with each of the plurality of areas of the current frame for each of the plurality of data sources.

In some embodiments, each of the plurality of data sources provides the output data corresponding to at least some of the plurality of vertices.

In some embodiments, each of the plurality of data sources comprises at least one digital video camera arranged at a camera position and orientation that is different from the camera position and orientation of another one of the plurality of data sources.

According to some embodiments, the output data corresponding to at least one of the plurality of vertices is outputted by two or more of the plurality of data sources.

In various embodiments, the plurality of data sources are arranged in two or more levels. The at least one display attribute for a first vertex of the plurality of vertices is determined based on the output data outputted by the at least one of the plurality of data sources in a first level of the two or more levels.

In some embodiments, the at least one display attribute for the plurality of vertices other than the first vertex is determined based on the output from the plurality of data sources associated with levels other than the first level when a weight associated with one of the at least one display attribute for the first vertex exceeds a predetermined threshold.

According to some embodiments, the at least one display attribute for the first vertex is determined based on the output data outputted by the at least one of the plurality of data sources associated with a second level of the two or more levels when the weights associated with any of the at least one display attribute is equal to or less than a predetermined threshold.

In some embodiments, the method further includes projecting at least one of the plurality of vertices onto one of the plurality of areas.

In various embodiments, partitioning a model of a target space into a plurality of vertices includes at least: receiving an exterior boundary of the model of the target space; determining density of the plurality of vertices; and sampling a volume defined by the exterior boundary of the model based on the density of the plurality of vertices.

In some embodiments, the density of the plurality of vertices is determined based on at least one of resolution desired, processing power available, and network conditions.

Various embodiments related to an apparatus, the apparatus configured to: partition a model of a target space into a plurality of vertices; determine at least one display attribute associated with each of the plurality of vertices based on output data observed by a plurality of data sources; and select one of the at least one display attribute for each of the plurality of vertices.

In some embodiments, the apparatus is further configured to provide a plurality of data sources, each of the plurality of data sources output data corresponding to a current frame as the output data comprising a plurality of areas.

In various embodiments, each of the plurality of areas corresponds to one of the plurality of vertices.

In some embodiments, determining the at least one display attribute associated with each of the plurality of vertices comprises determining a display attribute associated with each of the plurality of areas of the current frame for each of the plurality of data sources.

According to some embodiments, each of the plurality of data sources provides the output data corresponding to at least some of the plurality of vertices.

In some embodiments, each of the plurality of data sources comprises at least one digital video camera arranged at a camera position and orientation that is different from the camera position and orientation of another one of the plurality of data sources.

Various embodiments relate to a non-transitory computer-readable storage medium storing program instructions that, when executed, causes a processor to: partition a model of a target space into a plurality of vertices; determine at least one display attribute associated with each of the plurality of vertices based on output data observed by a plurality of data sources; and select one of the at least one display attribute for each of the plurality of vertices.

BRIEF DESCRIPTION OF THE DRAWINGS

FIG. 3D is a model of a target space according to various embodiments.

FIG. 8B may be table showing vertices requiring to be processed at each level of data sources according to various embodiments.

FIG. 9B is a mapping table illustrating relationship between a given vertex and frames of data sources capturing the vertex.

FIG. 12 is an example of a weighting table implemented according to various embodiments.

BRIEF DESCRIPTION OF THE DRAWINGS

Figure 1A:
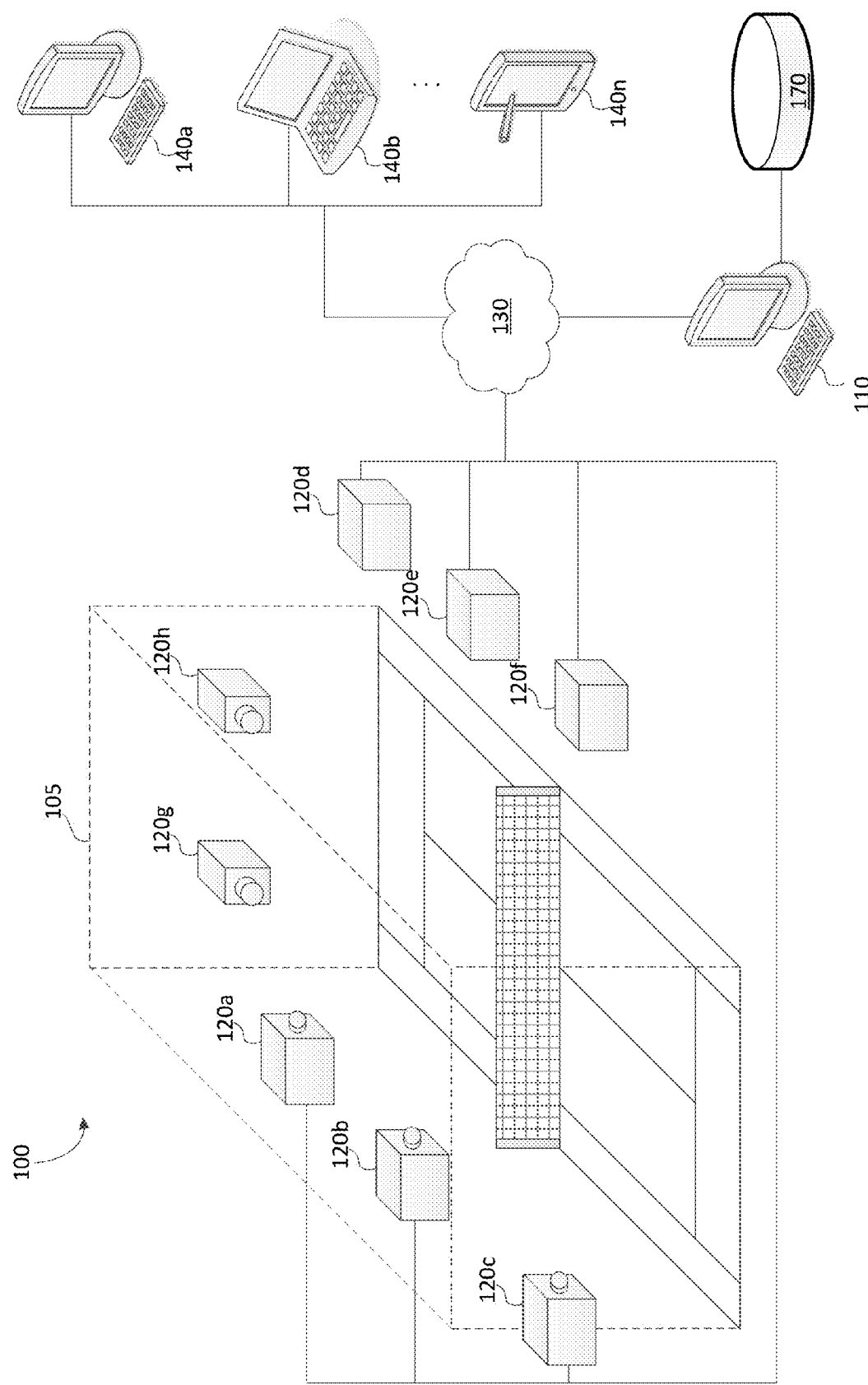
FIG. 1A is a schematic block diagram illustrating an example of a 3-dimensional model reconstruction system according to various embodiments.

In the following description of various embodiments, reference is made to the accompanying drawings which form a part hereof and in which are shown by way of illustration specific embodiments in which the invention may be practiced. It is to be understood that other embodiments may be utilized, and structural changes may be made without departing from the scope of the various embodiments disclosed in the present disclosure.

Embodiments described herein relate to systems and methods for capturing, processing, and reconstructing a 3-dimensional model of a target space. Specific implementations of the systems and methods described may include displaying live scenes occurring within the target space in real-time. The 3-dimensional model can be generated in a pipeline that outputs a streaming, moving model with changing surface projections for display characteristics such as color. In other words, a 3-dimensional model of the target space may be automatically generated based on videos and/or images captured using weights for particular display attributes of a display characteristic for vertices defined within the target space. The 3-dimensional model may then be reconstructed for displaying, for which unique points of views around or within the live scenes may be rendered for consumption by end-users.

The target space may be partitioned into a plurality of discrete volumes, each of the discrete volumes may be associated with a vertex. Thus, a plurality of vertices may make up the target space. Each vertex may be associated with display characteristics such as colors, textures, frequency transforms, wavelet transforms, averages, standard deviations, a combination thereof, and/or the like. When the display characteristics are determined for each of the vertices at a single point in time (e.g., which respect to a frame of video), the 3-model of the target space for that point in time may be reconstructed by using projections to grant the end users 2-dimensional and/or 3-dimensional display of the target space at that moment in time. A streaming video (of the reconstructed 3-dimensional model of the target space) may be produced when consecutive frames are determined based on the display characteristics/attributes of the vertices at each frame (depending on frame rate).

To determine the display characteristics, a plurality of data sources (e.g., cameras) may be positioned around or within the target space to capture videos (or images) of the target space. Given different camera poses configured for the data sources, each of the data sources may capture at least some vertices in a given frame as a 2-dimensional area within the frame/image. In other words, a fraction of a pixel or at least one pixel may correspond to at least one vertex. Processing techniques (e.g., weighting display attributes observed by the data sources) to select one out of a plurality of display attributes associated with the vertex (as shown in the fraction of the pixel or the at least one pixel) may be utilized in the manner described.

Instead of complex searching, embodiments described herein are concerned with using brute force math and simple comparisons to gain insight on 3-dimensional vertices. This allows for partitioning the processing tasks into discrete data blocks/threads for distributed processing. In particular embodiments, the projection of the vertices onto corresponding areas of the image/frame, the processing of the captured images/videos to produce weights corresponding to the display attributes observed, and to select one of the plurality of display attributes observed for each of the vertices may be performed by a distributed computing framework as described in "SYSTEMS AND METHODS FOR SCALABLE ASYNCHRONOUS COMPUTING FRAMEWORK" (application Ser. No. 14/537,768).

For example, the distributed computing framework described therein may be an asynchronous NoSql server (as generalized in a backend device) using minimal metadata. The NoSql server may be connected with a plurality of user devices via a network (e.g., the internet), each user device having user cores (e.g., GPU cores). The NoSql server may divide the processing tasks based on video frame, vertex (or a slice of vertices), source device, time, and/or the like. Metadata (e.g., frame location, vertex location, and/or the like) may be transmitted to the user devices for processing. The user devices may return an output (e.g., weighting) with respect to a display attribute associated with a vertex to the backend device (or a remote server/database). Accordingly, the 3-dimensional model processing task may be split into a large number of easily computable threads/blocks for processing over a large neural network, where each of the neurons (e.g., the user devices) may compute the task in a parallel and asynchronous manner. From the outputs of each of the user devices, a pipeline of streaming 3-dimensional display data may be generated.

In some embodiments, the user device may be coupled to, or supplying the data source used to determine the color of vertices. In one example, the user device (e.g., a cell phone) may project a video from a camera onto a single flat plane, or cloud of vertices, of the scene. This single projection is simple and easy for cell phones today. The output may be streamed to a content delivery network (CDN), where data from additional (live) data sources may be aggregated. The user device may supply all input in that case, including the camera pose in space, which may be determined in the same way for ordinary cameras. Such determination may be carried out with markers in the scene, a 3D shape in a corresponding 3D space, the camera's intrinsic parameters, and linear algebra to solve for the projection.

FIG. 1A is a schematic block diagram illustrating an example of a 3-dimensional model reconstruction system 100 according to various embodiments. Referring to FIG. 1A, the 3-dimensional model reconstruction system 100 may include at least a backend device 110, a plurality of data sources 120*a*-120*h* (e.g., a first source device 120*a*, a second source device 120*b*, . . . , an eighth source device 120*h*), a target space 105, a network 130, a plurality of user devices 140*a*-140*n* (e.g., a first user device 140*a*, a second user device 140*b*, . . . , a n-th user device 140*n*), and a database 170.

In some embodiments, the network 130 may allow data transfer between the backend device 110 and the user devices 140*a*-140*n*. In further embodiments, the network 130 may also allow data transfer between the data sources 120*a*-120*h* and the backend device 110/the user devices 140*a*-140*n*. In still further embodiments, the network 130 may enable data transfer between the database 170 and the backend device 110. The user devices 140*a*-140*n* may be connected to each other through the network 130. The network 130 may be a wide area communication network, such as, but not limited to, the Internet, or one or more Intranets, local area networks (LANs), ethernet networks, metropolitan area networks (MANs), a wide area network (WAN), combinations thereof, and/or the like. In particular embodiments, the network 130 may represent one or more secure networks configured with suitable security features, such as, but not limited to firewalls, encryption, or other software or hardware configurations that inhibits access to network communications by unauthorized personnel or entities. The data transmittable over the network 130 may be encrypted and decrypted within shader language on user cores 150 of the user devices 140a-140n using per frame keys, further securing the data.

In some embodiments, the data sources 120a-120h and the backend device 110 may be connected via a first network, the backend device 110 and the database 170 may be connected via a second network, and the backend device 110 and the user devices 140a-140n may be connected via a third network. Each of the first, second, and third networks may be a network such as, but not limited to the network 130. Each of the first, second, and third networks may be a different network from the other networks in some embodiments. In other embodiments, two of the first, second, and third networks may be a same network.

The target space 105 may be any 3-dimensional space to be captured by the data sources 120a-120h. Examples of the target space 105 include, but are not limited to, a stadium, amphitheater, court, building, park, plant, farm, room, a combination thereof, and/or the like. In particular, as shown in FIG. 1A, the target space 105 takes form of a tennis court, as a non-limiting example. In other words, virtually any venue, location, room, and/or the like may be represented as a 3-dimensional volume such as the target space 105. The target space 105 may be sampled and partitioned into a plurality of discrete volumes, each of which may be associated with a vertex. The model of the target space 105 may include display characteristics/attributes associated with each of the vertices.

Each vertex may be identified by a unique identifier. In particular embodiments, the identifier may be based on position of the vertex in the target space 105. For example, a coordinate system may be implemented for the target space 105 such that each vertex may be identified by a particular set of coordinates of the coordinate system.

Each of the data sources 120a-120h may be connected to the backend device 110 (e.g., via the network 130 or otherwise), where the backend device 110 may generate metadata of the outputs (e.g., video feed or images) of data sources 120a-120h. The data source 120 may be connected to the user devices 140a-140n (e.g., via the network 130 or otherwise) for providing source data to be processed by the user devices 140a-140n. For example, the data sources 120a-120h may include any suitable devices for capturing videos and/or images and outputting raw video and/or image data to the backend device 110. In particular embodiments, each of the data sources 120a-120h may include at least one camera (e.g., digital cameras, high-definition digital cameras, IP-cameras, or other cameras with network capabilities). In other embodiments, the raw data outputted by the data sources 120a-120h may be routed to a network device, which will relay the data to the backend device 110.

The data sources 120a-120h may be positioned around or within the target space 105 to capture videos and/or images of the target space 105. For example, data sources (such as, but not limited to the data sources 120a-120h) may be positioned around the top, bottom, and/or side surfaces of a target space (such as, but not limited to, the target space 105) and facing an interior of the target space. In further embodiments, data sources may be positioned within the target space for better coverage of the vertices that may be difficult to be captured if all the data sources were to be positioned outside of the interior volume of the target space. In the non-limited example shown in FIG. 1A, the first data source 120a, the second data source 120b, and the third data source 120c may be positioned along a first side surface of the target space 105; the fourth data source 120d, the fifth data source 120e, and the sixth data source 120f may be positioned along a second side surface of the target space 105; and the seventh data source 120g and the eighth data source 120h may be positioned along a third side surface of the target space 105.

Each of the data sources may have a different or unique camera pose (i.e., the position and orientation of the cameras relative to the target space). For example, the data sources may be positioned in a grid-like manner (spaced evenly) and pointing directly forward in a line of sight perpendicular to a surface of the target space. A plurality of rows and columns of data sources may be provided for a given surface of the target space. In other embodiments, the data sources may be positioned in a random or semi-random pattern. The camera pose of the data sources may be limited by the space around the target space and be placed in positions and orientations based on the available geometry of objects and obstacles in the space around the target space.

Distance may be provided between the surfaces or edges of the target space 105 and the data sources 120a-120h. The longer the distance, the more vertices may be captured by a given data source. On the other hand, longer distance may cause lower resolution of the captured video/image data, thus causing errors when processed. The distance between a data source and the target space may be determined based on camera resolution, the volume of the target space, the number of other data sources available, a combination thereof, and/or the like.

While 8 data sources 120a-120h are shown in FIG. 1A, one of ordinary skill in the art should appreciate that, more or less number of data sources (such as, but not limited to data sources 120a-120h) may be provided. A larger number of data sources spread out around or in the target space may provide for a larger sample size (e.g., more frames of video) for processing, thus providing a large number of weights for a given display attribute associated with a given vertex in a given frame time. Accuracy and faithfulness is thus improved with larger number of weighting values. On the other hand, larger number of data sources may cause prolonged processing due to the increase in unprocessed data.

Figure 1B:
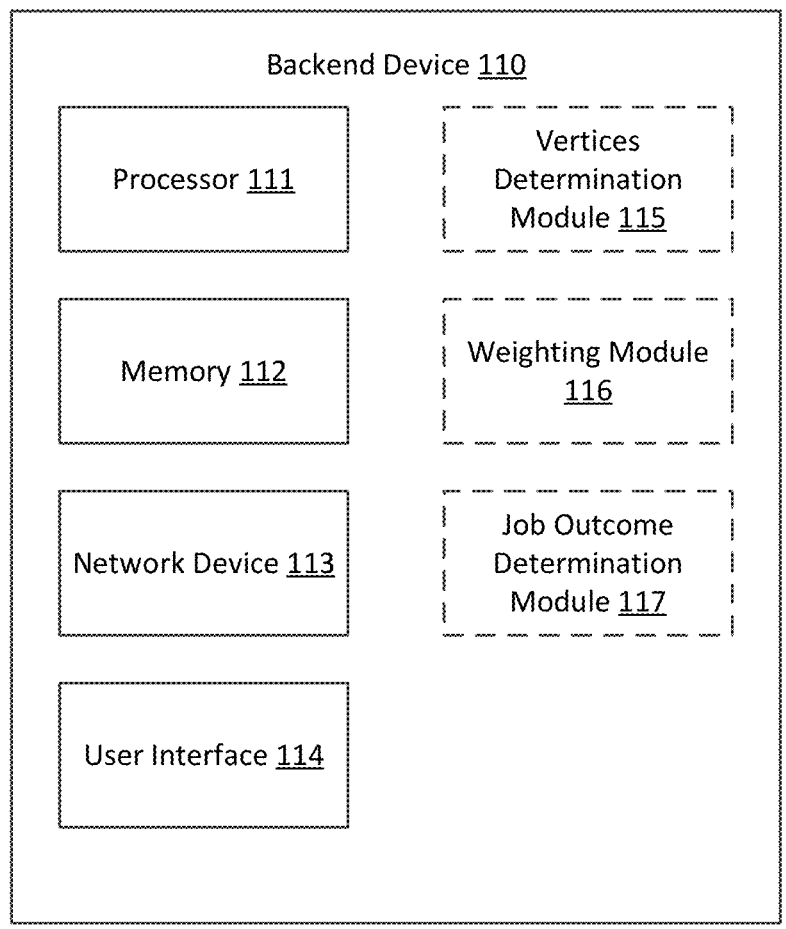
FIG. 1B is a block diagram illustrating an example of the backend device according to various embodiments.

FIG. 1B is a block diagram illustrating an example of the backend device 110 according to various embodiments. Referring to FIGS. 1A-1B, the backend device 110 may include a processor 111, memory 112 operatively coupled to the processor 111, network device 113, user interface 114, and/or the like. In some embodiments, the backend device 110 may include a desktop computer, mainframe computer, a server unit, laptop computer, pad device, smart phone device or the like, configured with hardware and software to perform operations described herein. The backend device 110 may be, in particular embodiments, a redis publish/subscribe server, and/or a NoSql server.

For example, the backend device 110 may include typical desktop PC or Apple™ computer devices, having suitable processing capabilities, memory, user interface (e.g., display and input) capabilities, and communication capabilities, when configured with suitable application software (or other software) to perform operations described herein. Platforms suitable for implementation include Amazon/Debian Linux, HTML (e.g., HTML5) browsers without plug-ins (such as java or flash), or the like. Thus, particular embodiments may be implemented, using processor devices that are often already present in many business and organization environments, by configuring such devices with suitable software processes described herein. Accordingly, such embodiments may be implemented with minimal additional hardware costs. However, other embodiments of the backend device 110 may relate to systems and process that are implemented with dedicated device hardware specifically configured for performing operations described herein.

The processor 111 may include any suitable data processing device, such as a general-purpose processor (e.g., a microprocessor). In the alternative, the processor 111 may be any conventional processor, controller, microcontroller, or state machine. The processor 111 may also be implemented as a combination of computing devices, e.g., a combination of a DSP and a microprocessor, a plurality of microprocessors, a GPU, at least one microprocessors in conjunction with a DSP core, or any other such configuration.

The memory 112 may be operatively coupled to the processor 111 and may include any suitable device for storing software and data for controlling and use by the processor 111 to perform operations and functions described herein, including, but not limited to, random access memory (RAM), read only memory (ROM), floppy disks, hard disks, dongles or other recomp sensor board (RSB) connected memory devices, or the like.

The network device 113 may be configured for communication over the network 130. The network device 113 may include interface software, hardware, or combinations thereof, for communication over the network 130. The network device 113 may include hardware such as network modems, wireless receiver or transceiver electronics, and/or software that provide wired or wireless communication link with the network 130 (or with a network-connected device). In particular embodiments, the network device 113 may be coupled to the processor 111 for providing communication functions. The network device 113 may provide telephone and other communications in accordance with typical industry standards, such as, but not limited to code division multiple access (CDMA), time division multiple access (TDMA), frequency division multiple access (FDMA), long term evolution (LTE), wireless fidelity (WiFi), frequency modulation (FM), Bluetooth (BT), near field communication (NFC), and the like.

In particular embodiments, the user interface 114 of the backend device 110 may include at least one display device. The display device may include any suitable device that provides a human-perceptible visible signal, audible signal, tactile signal, or any combination thereof, including, but not limited to a touchscreen, LCD, LED, CRT, plasma, or other suitable display screen, audio speaker or other audio generating device, combinations thereof, or the like.

In some embodiments, the user interface 114 of the backend device 110 may include at least one user input device that provides an interface for designated personnel using the backend device 110. The user input device may include any suitable device that receives input from a user including, but not limited to one or more manual operator (such as, but not limited to a switch, button, touchscreen, knob, slider, keyboard, mouse, or the like), microphone, camera, image sensor, any types of remote connection control, or the like.

Still referring to FIGS. 1A-1B, the backend device 110 may additionally include a vertices determination module 115. In some embodiments, the vertices determination module 115 may be hardware/software modules for determining density and positions of the vertices associated with the target space 105. The vertices determination modules 150 may be a dedicated hardware/software entity within the backend device 110 having its own processor/memory (such as, but not limited to the processor 111 and the memory 112), or alternatively, uses the processor 111 and memory 112 of the backend device 110.

In some embodiments, the vertices determination module 115 may automatically determine the density and positions of vertices for the target space 105 based on given information (e.g., dimensions or exterior boundaries) relating to the target space 105. Suitable algorithms may specify a total number of vertices (or density) within the target space 105, such that the discrete volumes associated with each vertex may be the total volume of the target space 105 divided by the total number of vertices. The algorithms may alternatively include spacing requirements which may specify a distance between two vertices or the sizes of each discrete volume. In typical embodiments, the spacing of the vertices may be uniform throughout the target space 105. In other embodiments, the spacing of the vertices may be denser in some portions of the target space 105 (e.g., where actions of interest require more accuracy or higher resolution) while sparser in other portions of the target space 105 (e.g., in areas where advertisement or background may be).

In various embodiments, outer dimensions (exterior boundaries) of the target space 105 may be provided by user input or suitable imaging techniques. The exterior boundaries may form an overall volume of the target space 105, which may be sampled based on a given size for discrete volumes into which the overall volume may be partitioned or the density of vertices determined. Smaller samples (smaller discrete volumes) may correspond to denser sampling, and would allow the 3-dimensional model of the target space 105 to resemble the actual target space 105 more closely. This would, in turn, allow the extraction of observed display attributes and the reconstruction of the 3-dimensional model with the display attributes with more detail and higher resolution. On the other hand, sparse sampling may yield a model with lower detail and resolution, where the reconstruction of the 3-dimensional model may appear pixelated and rough when viewed on the user devices 140a-140b.

In other embodiments, the vertices determination module 115 may accept input from a separate device (not shown) or user input (through the user interface 114) concerning the number and position of the vertices within the target space 105. For example, the vertices determination module 115 may receive, from the separate device or the user interface 114, a model of the target space 105 including the positioning of the vertices.

The vertices determination module 115 may further project or otherwise map each vertex onto a frame or image as captured by each of the data sources 120a-120h in the manner described.

The backend device 110 may also include a weighting module 160. In some embodiments, the weighting module 160 may be hardware/software modules for determining observed display attributes and weights for each of the display attribute associated with the vertices in the manner described. The weighting module 160 may be a dedicated hardware/software entity within the backend device 110 having its own processor/memory (such as, but not limited to the processor 111 and the memory 112). Alternatively, the weighting module 160 may use the processor 111 and memory 112 of the backend device 110 in performing its functions.

The backend device 110 may also include a job outcome determination module 117. In some embodiments, the job outcome determination module 117 may be hardware/software modules for determining a job outcome (e.g., selecting one of the at least one display attribute observed for a display characteristic). In particular, job outcome determination module 117 may select a final display attribute for a given vertex in a given frame based on the weights associated with each potential display attribute as determined by the weighting module 160. The job outcome determination module 117 may be a dedicated hardware/software entity within the backend device 110 having its own processor/memory (such as, but not limited to the processor 111 and the memory 112). Alternatively, the job outcome determination module 117 may use the processor 111 and memory 112 of the backend device 110 in performing its functions.

The selected display attribute, as determined by the job outcome determination module 117, may be a display attribute captured by most data sources. In other embodiments, the selected display attribute, as determined by the job outcome determination module 117, may be associated with weights exceeding a predetermined threshold. In still other embodiments, the selected display attribute, as determined by the job outcome determination module 117, may be an average display attribute (e.g., average in the color channel when the display characteristic is color) when the standard deviation from the average display attribute is below a predetermined threshold.

In other embodiments, the backend device 110 may implement distributed computing framework as described in "SYSTEMS AND METHODS FOR SCALABLE ASYNCHRONOUS COMPUTING FRAMEWORK" (application Ser. No. 14/537,768), instead of having the localized vertices determination module 115, the weighting module 160, and/or the job outcome determination module 117. For example, the backend device 110 (via its processor 111) may segment the computing tasks performed by the vertices determination module 115, the weighting module 160, and/or the job outcome determination module 117 as described into discrete data blocks/threads to be distributed to a plurality of user devices for processing (e.g., by the GPU of the user devices). Thus, the functions described with respect to the vertices determination module 115, the weighting module 116, and the job outcome determination module 117 may be performed by devices other than the backend device 110. In particular, one or more of the vertices determination module 115, the weighting module 116, and the job outcome determination module 117 may be external to the backend device 110.

In addition to (or as an alternative to) the memory 112, the backend device 110 may be operatively coupled to the at least one database 170. The database 170 may be capable of storing a greater amount of information and provide a greater level of security against unauthorized access to stored information than the memory 112 in the backend device 110. The database 170 may include any suitable electronic storage device or system, including, but not limited to random access memory RAM, read only memory ROM, floppy disks, hard disks, dongles or other RSB connected memory devices, or the like. In particular embodiments, the database 170 may be a NOSQL database maintained by a redis server.

The database 170 and/or the memory 112 may be configured to store source data (e.g., unprocessed data) from the data sources. In some embodiments, the source data may be stored in either the database 170 or the memory 112. In other embodiments, at least a portion of the source data may be stored in one of the database 170 and the memory 112, while a separate portion of the source data may be stored in another one of the database 170 or the memory 112.

Each of the user devices 140a-140n may include general processing unit, memory device, network device, and user interface. The processing unit may be configured to execute general functions of the user devices 140a-140n, such as any suitable data processing device. The memory device of each of the user devices 140a-140n may be operatively coupled to the processing unit and may include any suitable device for storing software and data for controlling and use by the processing unit to perform operations and functions described herein. The network device of each of the user devices 140a-140n may include interface software, hardware, or combinations thereof, for communication over the network 130.

The user devices 140a-140n may each include a user interface including at least a display device for displaying information (e.g., text and graphics) to the users. The display device may include any suitable device that provides a human-perceptible visible signal, audible signal, tactile signal, or any combination thereof, including, but not limited to a touchscreen, LCD, LED, CRT, plasma, or other suitable display screen, audio speaker or other audio generating device, combinations thereof, or the like. The interface may be configured to display to a user of the user devices 140a-140n the projected video or image of the 3-dimensional model based on the final display characteristics associated with each vertex.

Each of the user devices 140a-140n may be any wired or wireless computing systems or devices. In some embodiments, the user devices 140a-140n may be a desktop computer, mainframe computer, laptop computer, pad device, or the like, configured with hardware and software to perform operations described herein. For example, each of the user devices 140a-140n may include typical desktop PC or Apple™ computer devices, having suitable processing capabilities, memory, user interface (e.g., display and input) capabilities, and communication capabilities, when configured with suitable application software (or other software) to perform operations described herein. In other embodiments, the user devices 140a-140n may include a mobile smart phone (such as, but not limited to an iPhone™, an Android™ phone, or the like) or other mobile phone with suitable processing capabilities. Typical modern mobile phone devices include telephone communication electronics as well as some processor electronics, one or more display devices and a keypad and/or other user input device, such as, but not limited to described above. Particular embodiments employ mobile phones, commonly referred to as smart phones, that have relatively advanced processing, input and display capabilities in addition to telephone communication capabilities. However, the user devices 140a-140n, in further embodiments of the present invention, may include any suitable type of mobile phone and/or other type of portable electronic communication device, such as, but not limited to, an electronic smart pad device (such as, but not limited to an iPad™), a portable laptop computer, or the like.

Figure 2:
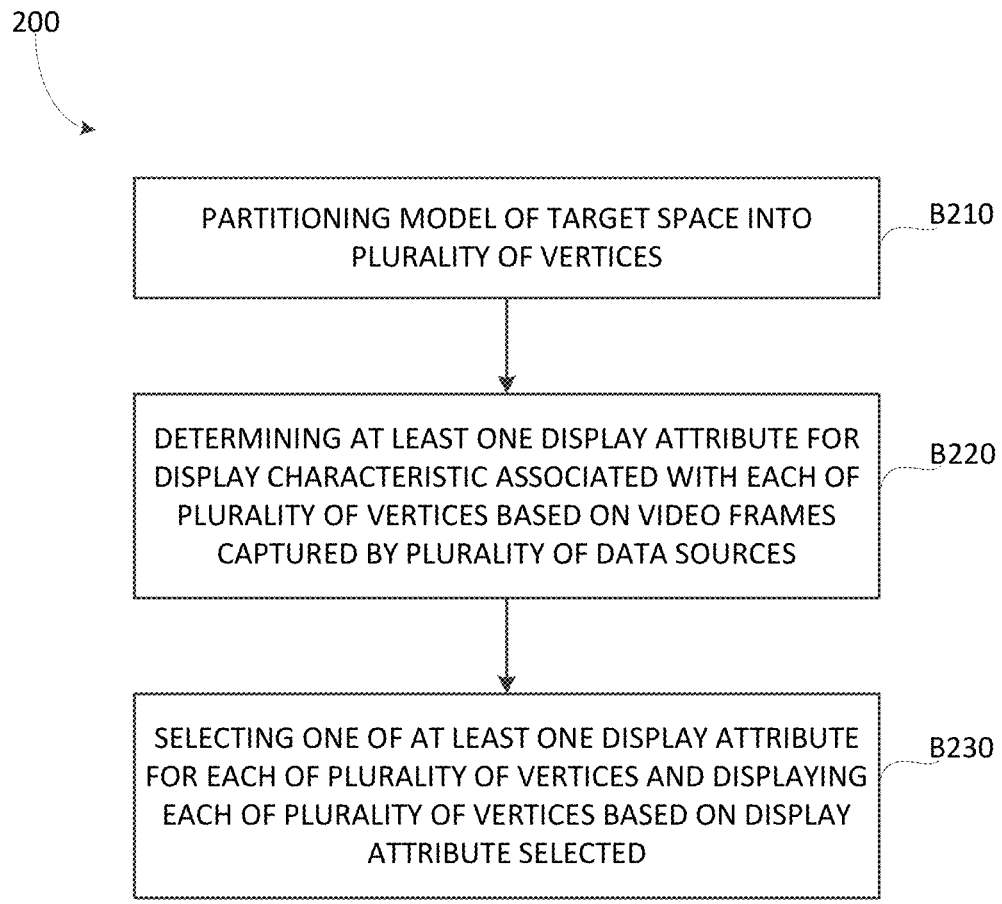
FIG. 2 is a process flowchart illustrating an example of a generalized 3-dimensional model reconstruction process according to various embodiments.

FIG. 2 is a process flowchart illustrating an example of a generalized 3-dimensional model reconstruction process 200 according to various embodiments. Referring to FIGS. 1A-2, the generalized 3-dimensional model reconstruction process 200 may be implemented with the 3-dimensional model reconstruction system 100 as illustrated in FIGS. 1A-1B. First at block B210, the vertices determination module 115 of the backend device 110 may partition a model of the target space 105 into a plurality of vertices, each of the plurality of vertices may be associated with (e.g., positioned in a center of) a discrete volume which is a portion of the target space 105.

Next at block B220, the weighting module 116 of the backend device 110 may determine at least one display attribute for a display characteristic associated with each of the plurality of vertices based on video frames (or images) captured by the plurality of data sources (e.g., the data sources 120a-120h). At a given frame time, each of the plurality of data sources may output a frame of video (or an image) capturing at least a portion (and vertices defined in that portion) of the target space 105. The display characteristic associated with a vertex may refer to at least one of: colors, textures, frequency transforms, wavelet transforms, averages, standard deviations, a combination thereof, and/or the like. Each vertex may be captured in at least one (often a plurality) display attribute, which is a specific type of one display characteristics. For example, red, yellow, blue may be examples of display attributes associated with the display characteristic color.

Next at block B230, the job outcome determination module 117 of the backend device 110 may select one of the at least one display attribute (e.g., select one color of a plurality of potential colors) for each of the plurality of vertices. Subsequently the backend device 110 or the user devices 140a-140n may display the model of the target space 105 based on the one selected display attribute of the at least one display attribute (for that display characteristics), for that current frame. As such, multiple display characteristics may be processed in parallel in the manner described above.

Figure 3A:
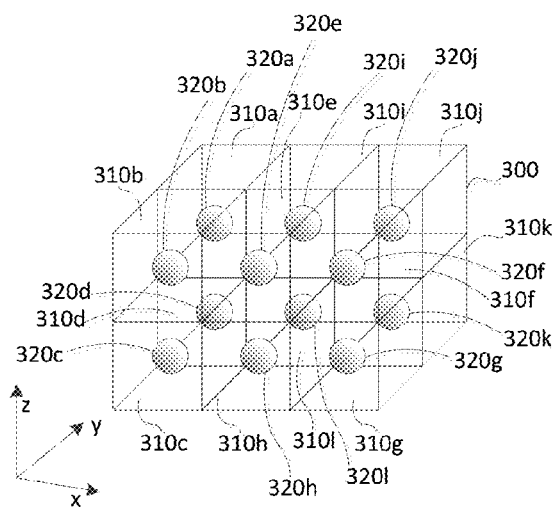
FIG. 3A is a schematic block diagram illustrating a perspective view of a target space according to various embodiments.
Figure 3B:
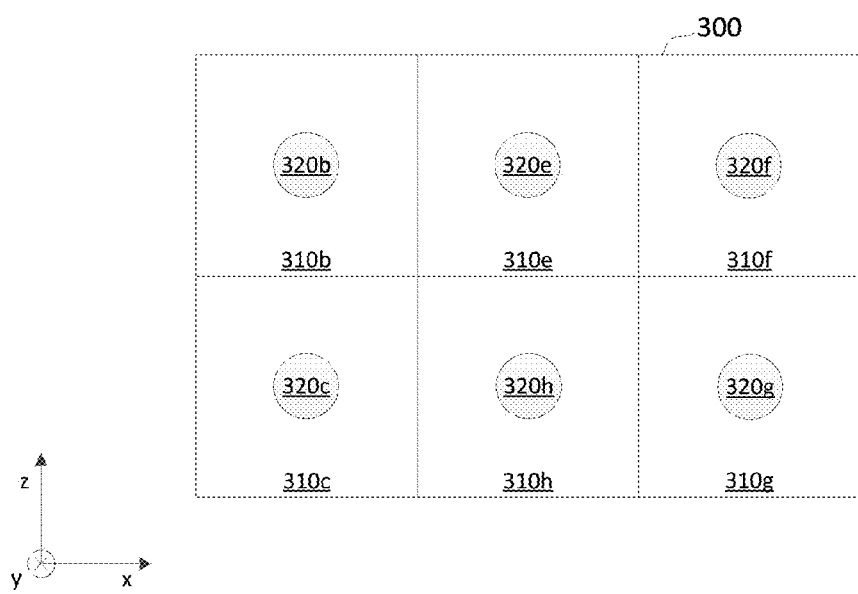
FIG. 3B is a schematic block diagram illustrating a frontal view of a target space.
Figure 3C:
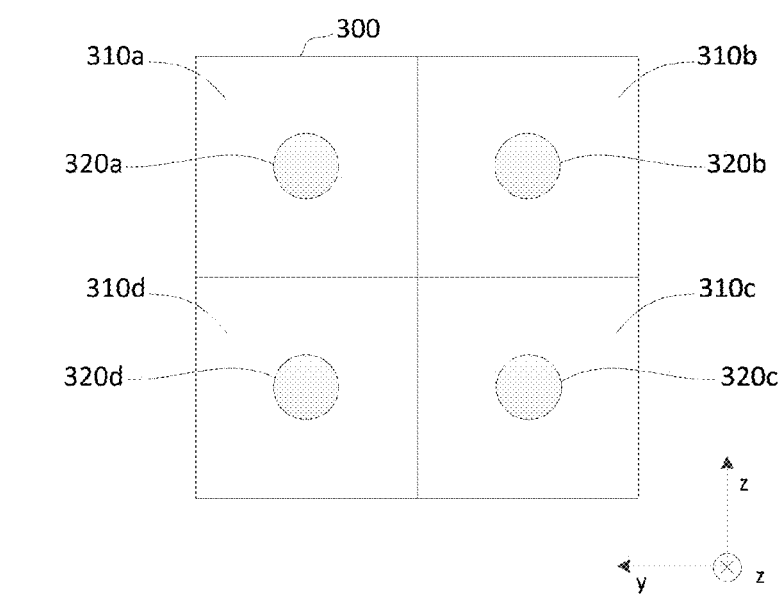
FIG. 3C is a schematic block diagram illustrating a side view of a target space.

FIG. 3A is a schematic block diagram illustrating a perspective view of a target space 300 according to various embodiments. FIG. 3B is a schematic block diagram illustrating a frontal view of the target space 300. FIG. 3C is a schematic block diagram illustrating a side view of the target space 300. Referring to FIGS. 1-3C, the target space 300 may a 3-dimensional space such as, but not limited to, a portion of the target space 105. The target space 300 may be partitioned into a plurality of discrete volumes 310a-310l (e.g., a first volume 310a, a second volume 310b, . . . , a twelfth volume 310l). Each of the discrete volumes 310a-310l may be associated with a vertex. For example, the first volume 310a may be associated with a first vertex 320a, the second volume 310b may be associated with a second vertex 320b, . . . , the twelfth volume 310l may be associated with a twelfth vertex 320l. Each of the discrete volumes 310a-310l may be of any suitable shape such as, but not limited to cuboids, cubes, and the like. For the sake of clarity, the target space 300 is scaled to include 12 vertices.

The discrete volumes and/or the vertices may be predetermined given that the dimensions for the target space 300 may be known. In some embodiments, for a target space of 60' by 30' by 10', there may be 6,000,000 vertices such as, but not limited to, the vertices 320a-320l. The larger the number of vertices, the more faithful and detailed the 3-dimensional model of the target space may be. When associated with the display characteristics, the larger number of the vertices may allow for high resolution when reconstructing and displaying the 3-dimensional model of the target space.

Each of the vertices 320a-320l may correspond to a portion of a pixel (e.g., 1/16, 1/8, 1/4, 1/2, or the like), pixel(s), macroblock(s), or the like when projected and displayed in a 2-dimensional context of the output of the data sources. For example, the user devices 140a-140n may be configured to display (with user interfaces) 3-dimensional projections of the target space 300 based on the vertices 320a-320l as 2-dimensional video streams. Each of the vertices 320a-320l may correspond to a portion of a pixel, at least one pixel, or at least one macroblock when captured by the data sources 120a-120h.

Each vertex may be associated with display characteristics such as, but not limited to, colors, textures, frequency transforms, wavelet transforms, averages, standard deviations. Various embodiments described herein may refer to color as an exemplary display characteristic. One of ordinary skill in the art would know that other display characteristics as stated may also be implemented in a similar manner.

Given that the camera pose (position and orientation) may be known in advance, the vertices (e.g., at least some of the vertices 320a-320l) captured by each data source (such as, but not limited to the data sources 120a-120h) may be determined. For example, a data source (e.g., a digital camera) capturing the frontal view (e.g., FIG. 3B) of the target space 300 may capture the frontal vertices (e.g., the second vertex 320b, the third vertex 320c, the fifth vertex 320e, the sixth vertex 320f, the seventh vertex 320g, and the eighth vertex 320h). Similarly, a data source capturing the side view (e.g., FIG. 3C) of the target space 300 may capture the side vertices (e.g., the first vertex 320a, the second vertex 320b, the third vertex 320c, and the fourth vertex 320d). Additional data sources may capture the back, top, bottom, and/or side views of the target space 300. Thus, a single vertex may be captured by multiple data sources. In particular, the data sources may capture display characteristics associated with each vertex.

Each vertex may be defined by a unique identifier based on the position of the vertex within the target space. In the no-limiting example illustrated in FIGS. 3A-3C, the fourth vertex 320d may be identified by its coordinates (1, 1, 1), the sixth vertex 320f may be identified by its coordinates (3, 2, 1), and the fifth vertex 320e may be identified by its coordinates (2, 2, 2).

FIG. 3D is a model 390 of the target space 105 according to various embodiments. Referring to FIGS. 1A-3D, the model 390 may include a plurality of vertices such as, but not limited to, the vertices 320a-320l. The vertices may be predetermined by any suitable algorithms or by user input as described. In various embodiments, the same set of vertices defined for a target space (e.g., the target space 105 or the target space 300) may be reused for a plurality of live events, given that the target space remains statically, such that the model involved the same vertices can still adequately represent the target space faithfully.

Figure 4:
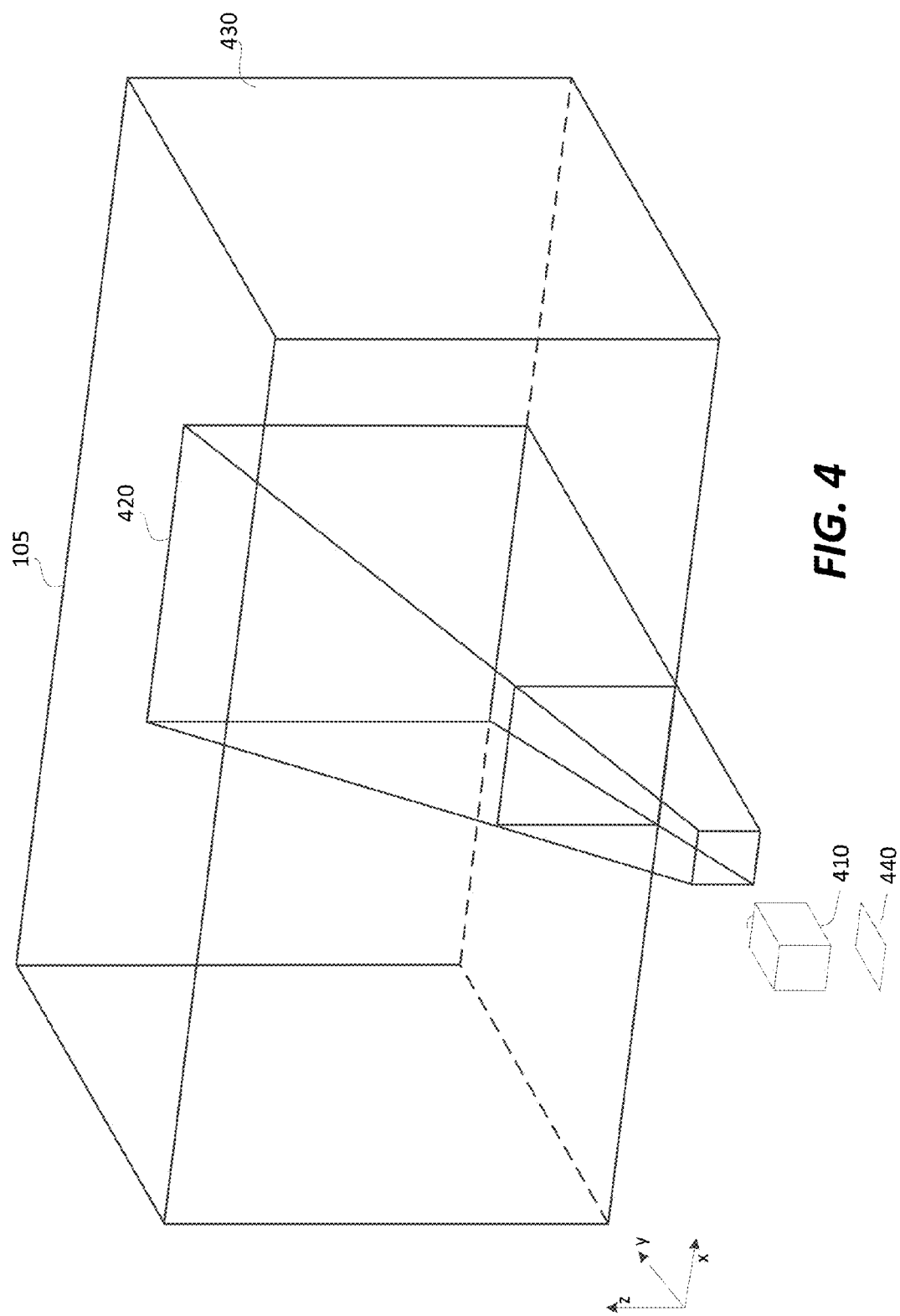
FIG. 4 is a schematic diagram illustrating a perspective view of a target space having at least some of its vertices being captured by a digital camera.

FIG. 4 is a schematic diagram illustrating a perspective view of the target space 105 having at least some of its vertices being captured by the digital camera 410. Referring to FIGS. 1A-4, in various embodiments, the target space 105 may include an interior volume 430. The interior volume 430 may be partitioned into a plurality of vertices such as, but not limited to, the vertices 320a-320l. For the sake of clarity, the vertices within the interior volume 430 are not shown in FIG. 4. A digital camera 410 (as a specific implementation of the data sources 120a-120g) may be provided at any suitable camera pose to capture images/video of the target space 105. The digital camera 410 may capture a captured space 420 representing a field of view of the digital camera 410. The vertices within the captured space 420 may be captured by the digital camera 410. Thus, a given source device may capture at least some vertices within the interior volume 430. All vertices may be captured by a camera that has been distanced sufficiently far away from the target space 105 (as indicated by the camera pose, which may be predetermined in setting up).

In some embodiment, the digital camera 410 (as well as the data sources 120a-120g) may include or be associated with a marker 440. The marker 440 may include any physical or digital indication of the location and/or angle (e.g., the camera pose) associated with the digital camera 410. In some embodiments, the marker 440 may be placed on or near the ground or other suitable objects on (below, or around) which the digital camera 410 is positioned. The marker 440 may include a checkerboard, QR code, or any specifically identifiable marker containing position from and/or angle data with respect to the target space 105, when the digital camera 410 is positioned on the marker. The marker 440 may be preliminarily placed around or within the target space 105 before the digital camera 410 is actually placed. The digital camera 410 may become associated with the marker 440 by scanning the information contained in the marker 440 with an associated scanning device. In other embodiments, the marker 440 may be placed in any suitable manner on the digital camera 410 and move with the digital camera 410. Accordingly, the backend device 110 may recognize the association between the output from the digital camera 410 and the camera pose as specified by the marker 440.

Figure 5:
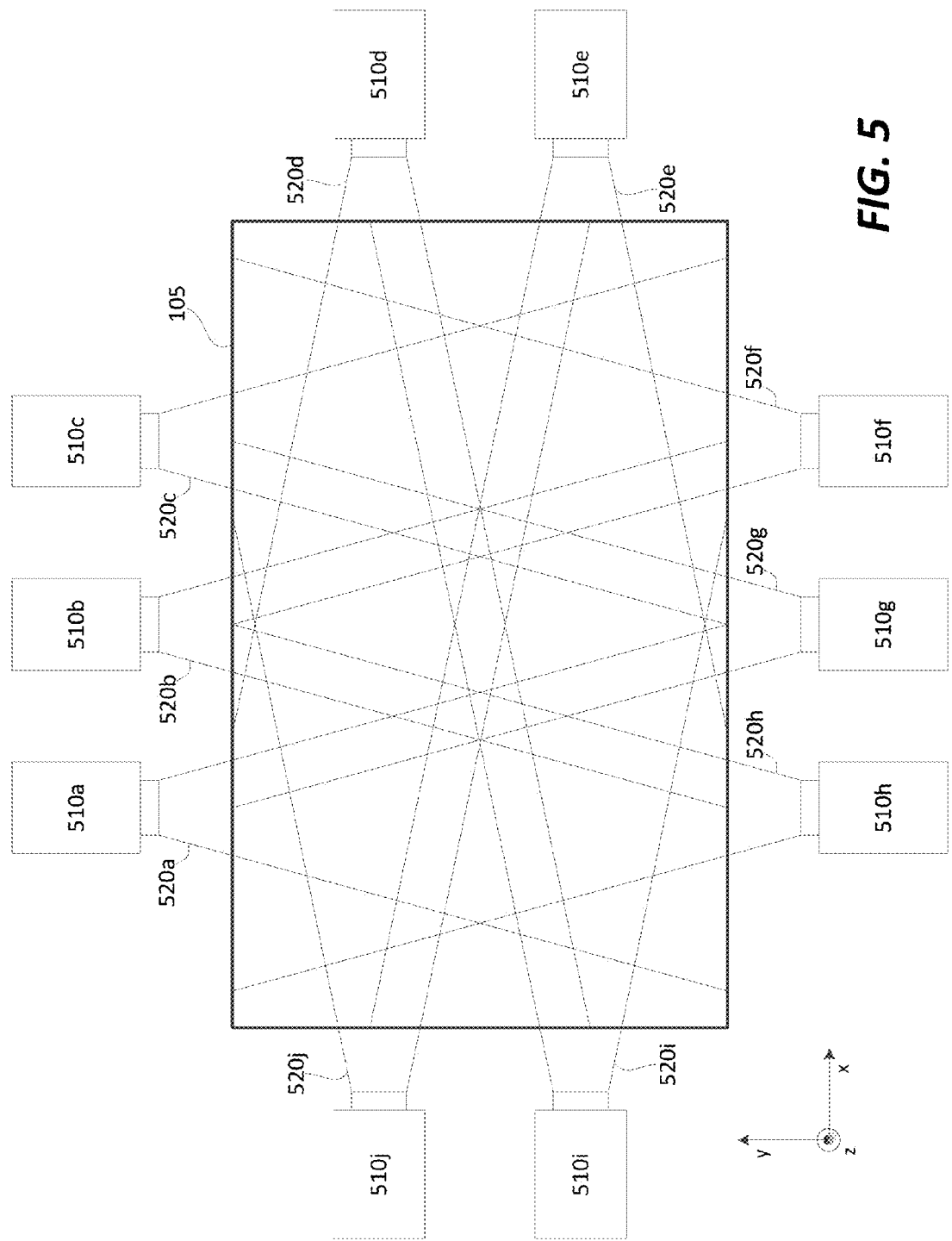
FIG. 5 is a schematic diagram illustrating a top view of a target space being captured by a plurality of data sources according to various embodiments.

FIG. 5 is a schematic diagram illustrating a top view of the target space 105 being captured by a plurality of data sources 510a-520j according to various embodiments. Referring to FIGS. 1A-5, the plurality of data sources 510a-520j may each be a data source such as, but not limited to, the data sources 120a-120g and/or the digital camera 410. It should be understood by one of ordinary skill in the art that the data sources 120a-120g may have any suitable camera pose (e.g., the distance from the target space 105, the distance from each of the data sources 120a-120g, the angle, and/or the like). The collective camera pose of the data sources 120a-120g may be of any organized or randomized pattern. The camera pose may affect the projection of the vertices onto the frames/images outputted by the particular data source as well as the vertices being captured by the particular data source. The location of the data sources 120a-120g may be also captured by way of a marker within the scene. The geometry of the marker is known, so all 2D projections of the marker allow deriving the 3D pose of the camera.

Each of the data sources 510a-520j may be associated with a unique field of view due to the camera pose associated with each of the data sources 510a-520j. For example, the first data sources 510a may be associated with a first field 520a, the second data sources 510b may be associated with a second field 520b, . . . , and the tenth data sources 510j may be associated with a tenth field 520j. At least two of the fields 510a-510j may overlap to capture a same vertex. For example, a vertex 530 may be captured by the first field 520a, the fourth field 520d, the entity field 520h, and the tenth field 520j. A large number of data sources capturing a given vertex from diverse camera poses can allow more accurate sampling of the vertex, and can thus yield more accurate results with respect to selecting the display attribute from the plurality of display attributes that may be outputted by the data sources capturing the given vertex.

While FIG. 5 illustrates the non-limiting example involving two dimensions (e.g., the x-y plane), it should be understood that the target space 105 may be captured by data sources such as, but not limited to the data sources 510a-510j in the manner described for the 3-dimensional volume of the target space 105.

Figure 6:
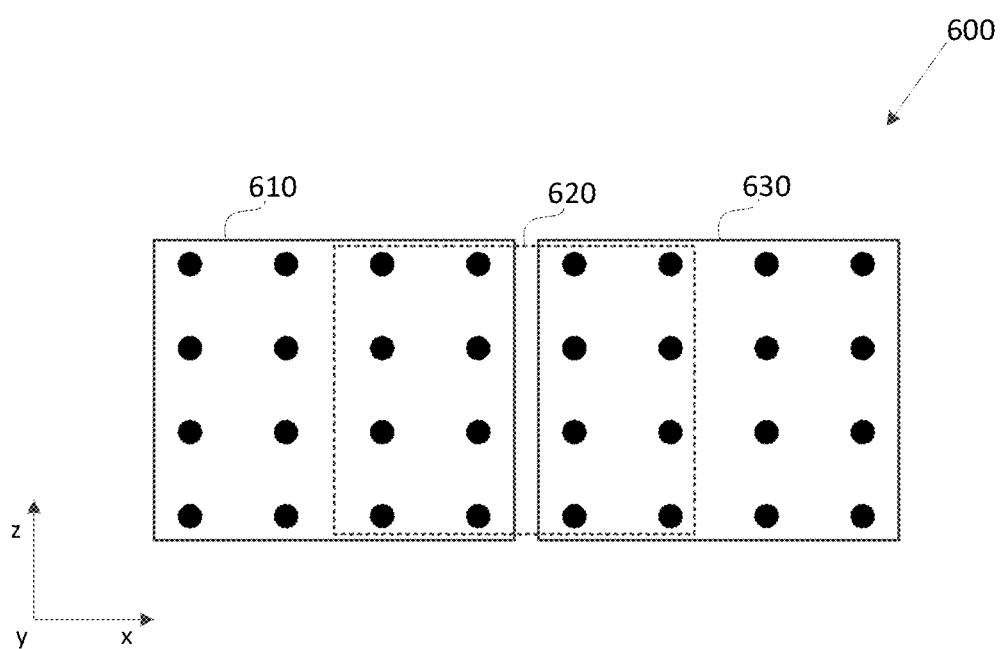
FIG. 6 is a schematic diagram illustrating a first set of vertices as seen in frames/images captured by data sources.

FIG. 6 is a schematic diagram illustrating a first set of vertices 600 as seen in frames/images captured by data sources. Referring to FIGS. 1A-6, the first set of vertices 600 may be any vertices described herein. A first portion of the first set of vertices 600 (e.g., a left portion containing 16 vertices) may be projected to a first frame 610 (as captured by a first data source such as any data source described herein). A second portion of the first set of vertices 600 (e.g., a middle portion containing 16 vertices) may be projected to a second frame 620 (as captured by a second data source such as any data source described herein). A third portion of the first set of vertices 600 (e.g., a right portion containing 16 vertices) may be projected to a third frame 620 (as captured by a second data source such as any data source described herein). Each of the vertices shown may be a first vertex in a string of vertices arranged in the y-direction (e.g., into the page). The vertex 640 may be captured by both the first frame 610 and the second frame 620. The location of the camera is also captured by way of a marker within the scene. The geometry of the marker is known, so all 2D projections of the marker allow deriving the 3D pose of the camera. Each vertex may be projected to each frame, but may be projected to a position outside the bounds of the frame (meaning the data sources may not observe/capture data related to all of the vertices, including any projected outside of bounds of the data sources).

Figure 7:
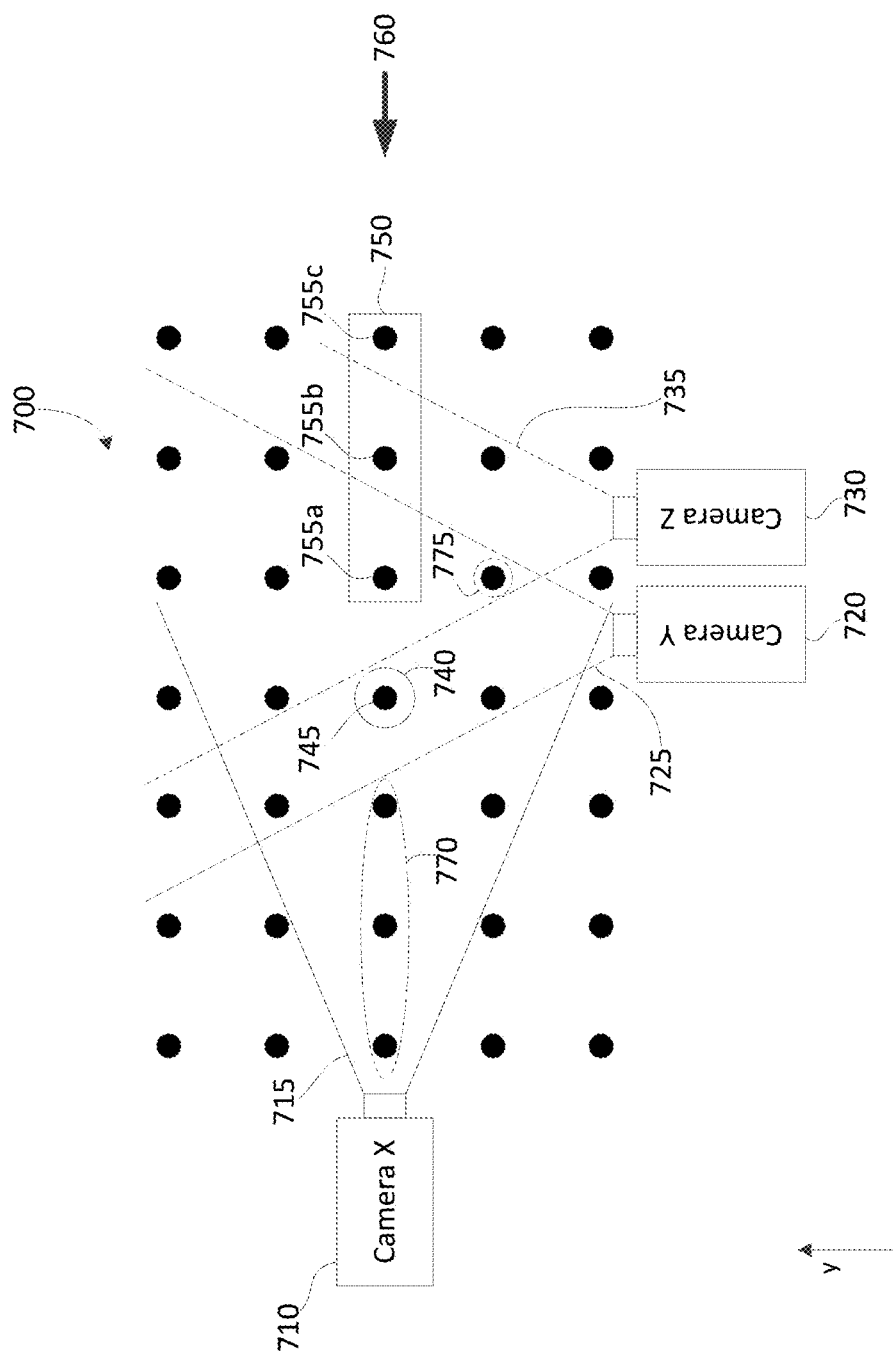
FIG. 7 is a schematic diagram illustrating a second set of vertices as occupied by objects in a given frame according to various embodiments.
Figure 8A:
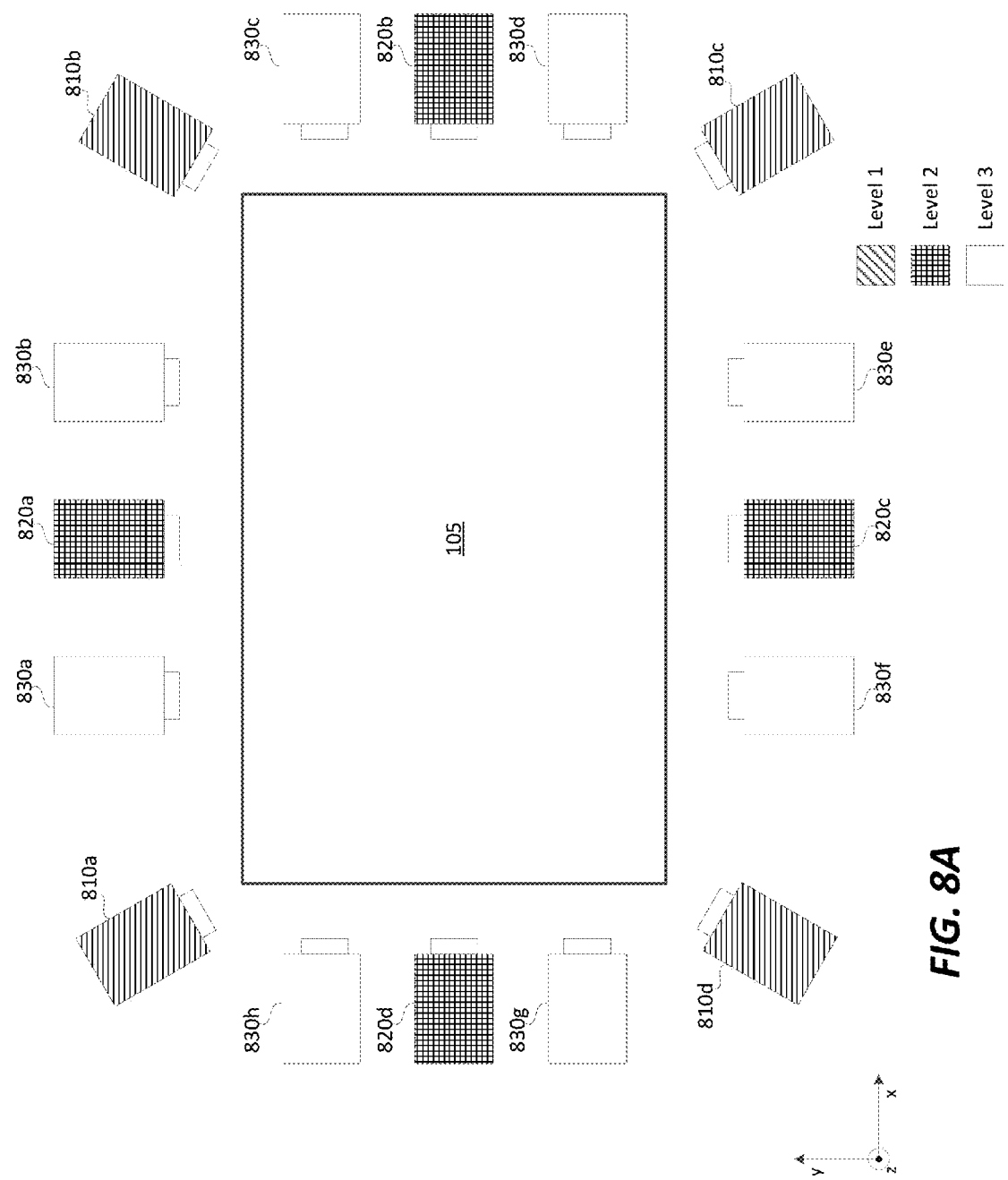
FIG. 8A is a schematic diagram showing a top view of a target space as being captured by different levels of data sources.

FIG. 7 is a schematic diagram illustrating a second set of vertices 700 as occupied by objects in a given frame according to various embodiments. Referring to FIGS. 1A-7, the second set of vertices 700 may be any vertex described herein. Three data sources (e.g., Camera X 710, Camera Y 720, and Camera Z 730) may be provided to capture display characteristics/attributes of the second set of vertices 700. In particular, Camera X 710 may capture the display characteristics/attributes of some of the second set of vertices 700 within Field X 715. Camera Y 720 may capture the display characteristics/attributes of some of the second set of vertices 700 within Field Y 725. Camera Z 730 may capture the display characteristics/attributes of some of the second set of vertices 700 within Field Z 735.

Camera X 710 may be configured to capture the display characteristics/attributes of vertices in a vertex row 760, which include unloaded vertices 770, first loaded vertex 745, second loaded vertex 775a, third loaded vertex 755b, and fourth loaded vertex 755c. The unloaded vertices 770 are not loaded with an object (i.e., no objects, other than air, occupy the blank vertices 770). The first loaded vertex 745 may be occupied by a first object 740. The second loaded vertex 775a, the third loaded vertex 755b, and the fourth loaded vertex 755c may be occupied by a second object 750.

Given that the camera pose of Camera X 710 may allow only one set of display characteristics/attributes to be captured concerning one vertex in the vertex row 760 given that each of the vertices of the vertex row 760 is stacked together and blocking vertices behind it relative to Camera X 710. For example, given that the unloaded vertices 770 is occupied by air which has no display characteristics/attributes, the first vertex in the vertex row 760 captured by Camera X 710 may be the first loaded vertex 745, which may have the display characteristics/attributes of the first object 740. Thus, Camera X 710 may output each of the unloaded vertices 770, the first loaded vertex 745, the second loaded vertex 775a, third loaded vertex 755b, and fourth loaded vertex 755c to have the display characteristics/attributes of the first object 740. The weighting for the display characteristics/attributes associated with the first object 740 for each of the vertices in the vertex row 760 may be increased.

However, by virtue of having additional data sources (Camera Y 720, Camera Z 730, and other cameras not shown, for clarity reasons) having different camera pose, the vertices inappropriately/failed to be captured may be appropriately captured by other data sources in better camera poses to appropriately capture the display characteristics/attributes of those vertices. For example, with reference to the second loaded vertex 755a, both Field Y 725 of Camera Y 720 and Field Z 735 of Camera Z 730 may capture the second loaded vertex 755a. As the preceding vertex 775 may be unloaded (e.g., unoccupied), both Camera Y 720 and Camera Z 730 may capture the second loaded vertex 755a to have the display characteristics/attributes of the second object 750 at the second loaded vertex 755*a*, which is appropriate. As such, appropriate weight (e.g., 2 from Camera Y 720 and Camera Z 730) may exceed inappropriate weight (e.g., 1 from Camera X 710) or a threshold. Other vertices may be captured and weighted in similar manner.

When the weighting of the display characteristics/attributes does not clearly indicate a dominant attribute out of all the captured attributes for a given vertex, the vertex may be completely (or at least substantially) within an object (e.g., blocked by other peripheral vertices) or the vertex may be air, the display characteristics/attributes may be selected as null or not available. The display characteristics/attributes for that vertex may be selected as a background characteristic/attribute (e.g., a background color), blanked, transparent, or the same as the display characteristics/attributes of nearest vertices that yield a set of valid display characteristics/attributes above confidence level, in the manner described.

Referring to FIGS. 1A-8A, FIG. 8A is a schematic diagram showing a top view of the target space 105 as being captured by different levels of data sources. In various embodiments, each of the data sources may be any data sources as described herein. The data sources may each have a unique camera pose. The data sources may be classified into a plurality of levels. In the non-limiting example as illustrated, the data sources may include first level devices 810*a*-810*d*, second level devices 820*a*-820*d*, and third level devices 830*a*-830*h*.

In some embodiments, each level may include data sources that can (collectively) capture all vertices in the target space 105, by virtue of the camera poses associated with each source device of the level. In other embodiments, each level may include data sources that can capture (collectively) some but not all vertices in the target space 105, by virtue of the camera poses associated with each source device of the level. In some embodiments, a number of data sources for a preceding level may be less than or equal to a number of data sources for a subsequent level. In the nonlimiting example of FIG. 8A, there are 4 devices for each of the first level devices 810*a*-810*d* and the second level devices 820*a*-820*d*, and there are 8 devices for third level devices 830*a*-830*h*. In other embodiments, a number of data sources for a preceding level may be greater than or equal to a number of data sources for a subsequent level.

In some embodiments, the data sources for a preceding level may be arranged in a more sparse pattern as compared to the data sources for at least one subsequent level. In other embodiments, the data sources for a preceding level may be arranged in a more dense pattern as compared to the data sources for at least one subsequent level. In some embodiments, each source device from a same level may not be placed adjacent to one another. In other or further embodiments, each source device from a same level may be placed adjacent to one another.

Generally, different levels of source devices may serve to efficiently conduct vertex sampling and drop/withdraw from consideration vertices at the end of each level. The dropped/withdrew vertices are not considered by subsequent levels given that a display attribute may already been selected based on the confidence level. The vertices of the target space 105 may be projected onto areas on frames (at a same frame time) captured by each of the data sources (the first level devices 810*a*-810*d*) in the manner described. The corresponding areas may be sampled for display characteristics/attributes associated with the vertices. When a given vertex has a display attribute (e.g., the color coded "4394492") exceeds a predetermined threshold (e.g., each of the first level devices 810*a*-801*d* may capture the given vertex in the same color 4394492, thus exceeding a threshold weight of 4), that display attribute (4394492) may be selected as the display attribute for the particular display characteristic of that vertex. The vertex may be dropped from processing by the subsequent levels (e.g., the second level devices 820*a*-820*d*, and the third level devices 830*a*-830*h*), given that the confidence level associated with the first level (as implemented with the threshold method) has already been met. In further embodiments, whereas the output from each data source within a given level are extremely dissimilar (e.g., the largest weighting for a given display attribute is a very small fraction of the total number of devices present in the level) concerning a given vertex, the vertex may be designated as unloaded (e.g., air) or inside of a volume, and is also dropped from consideration at subsequent levels.

FIG. 8B may be table 900 showing vertices required to be processed at each level of data sources according to various embodiments. Referring to FIGS. 1A-8B, various levels of data sources (such as, but not limited to, the first level devices 810*a*-810*d*, second level devices 820*a*-820*d*, and third level devices 830*a*-830*h*) may be provided for a system (e.g., the 3-dimensional model reconstruction system 100) for processing the vertices of the target space 105 by levels.

For example, the target space 105 may be partitioned into a plurality of vertices (e.g., vertex a, vertex b, . . . , vertex n). At level 1 910, vertex b may be found to have a display attribute above confidence level (e.g., having weighting exceeding a predetermined threshold) and is thus withdrawn from further processing in the subsequent levels. At level 2 920, vertex c may be found to have a display attribute above confidence level (e.g., having weighting exceeding a predetermined threshold) and is thus withdrawn from further processing in the subsequent levels. At any level between level 2 920 and level N 930, vertex a may be found to have a display attribute above confidence level (e.g., having weighting exceeding a predetermined threshold) and is thus withdrawn from further processing in any subsequent levels. All remaining vertices in level N 930 may be processed.

Figure 9A:
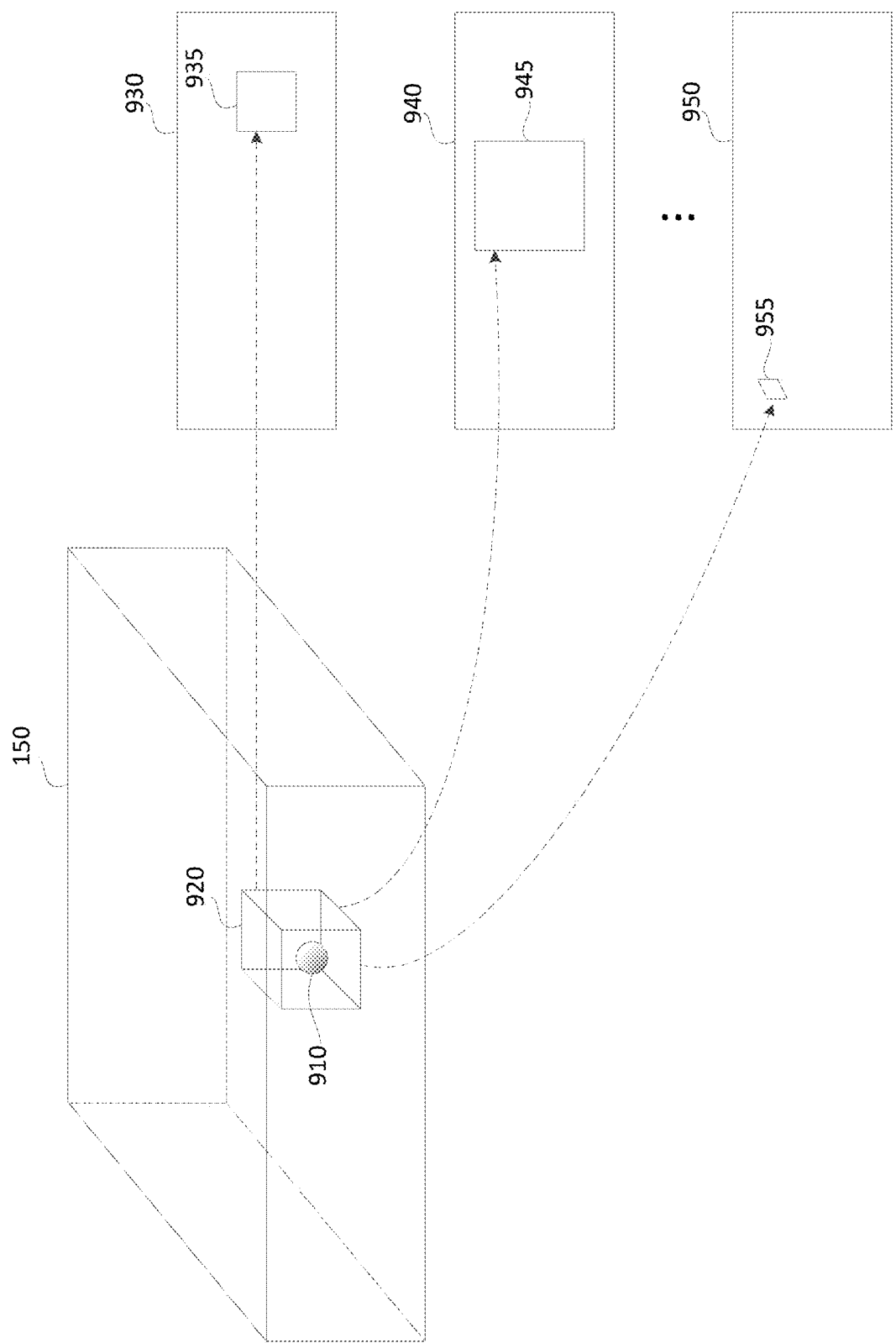
FIG. 9A is a schematic diagram illustrating an example of vertex projection according to various embodiments.

FIG. 9A is a schematic diagram illustrating an example of vertex projection according to various embodiments. Referring to FIGS. 1A-9A, a vertex of interest 910 may be associated with a discrete volume of interest 920 within the target space 105. The vertex of interest 910 may be any vertices as described herein. A first frame 930 may be an image or a frame of a video captured by a first source device (e.g., any suitable source device as described herein). A second frame 940 may be an image or a frame of a video captured by a second source device (e.g., any suitable source device as described herein). A third frame 950 may be an image or a frame of a video captured by a third source device (e.g., any suitable source device as described herein). Each of the first frame 930, the second frame 940, and the third frame 950 may be a frame captured by a separate data source at a same frame time.

The vertex 910 may be projected onto each of the first frame 930, the second frame 940, and the third frame 950 to determine an area (a fraction of a pixel, at least one pixel, at least one macroblock, and/or the like) in each frame that corresponds to the vertex 910. In other words, the vertex 910 in the 3-dimensional volume of the model for the target space 105 may be projected onto a 2-dimensional image/frame in any suitable transformation matrix. For example, the projection of the vertex of interest 910 from the 3-dimensional model of the target space 105 onto a frame capturing the vertex of interest 910 may be a function of camera pose (e.g., distance from the vertex of interest 910, angle/orientation with respect to the vertex of interest 910 or the axis defined for the target space 105), size of the target space 105, screen size of the frame, a combination thereof, and/or the like.

The projected 2-dimensional areas (e.g., a first area 935 in the first frame 930, a second area 945 in the second frame 940, a third area 955 in the third frame 950) may be of different size, shape (orientation of the plane as shown for the third area 955), position in the frame. This may be caused by the differences in camera pose.

FIG. 9B is a mapping table 960 illustrating relationship between a given vertex and frames of data sources capturing the vertex. Referring to FIGS. 1A-9B, the relationship between a given vertex (such as, but not limited to, any vertices described herein) in model of the target space 105 as projected onto frames of different data sources (such as, but not limited to, any data sources described herein) may be stored in the memory 112, the database 170, or other processing devices such as user devices, for frames captured subsequent in time for each of the data sources. In response to the position/density of the vertices change or in response to the camera pose for a data source change, the projections may be updated and restored.

Still referring to FIGS. 1A-9B, in the non-limiting example illustrated in FIG. 9B, a vertex n 970 may be any vertices described herein, and is index in memory by an identifier such as its coordinates in the model of the target space 105. A plurality of data sources (e.g., Data Source A 980, Data Source B 982, . . . , Data Source N 984, as shown in the data source column 985) may be provided to capture display characteristics/attributes of vertices within the target space 105. In some embodiments, at least one data source (e.g., Data Source B) of the vertex n 970 may not be configured (due to its camera pose) to capture the vertex n 970. Thus, the area coordinates listed in the projected position on frame column 990 is listed as void or "N/A." In other words, the determining of the display attribute associated with the vertex n 970 is unrelated to the frames of Data Source B 982 (unless either the vertex n 970 or the camera pose of Data Source B 982 changes). For other data sources, a planar coordinate may be provided to indicate the area on frame that is mapped to the vertex n 970. For example, the area of a frame may be indicated by the coordinates ($\alpha_1,\beta_2$). In further embodiments, the mapping table 960 may include a frame location column 995 detailing where the frame for each data source is stored. The frames may be stored in the memory 112, the database 170, or anywhere on the Internet.

Figure 10:
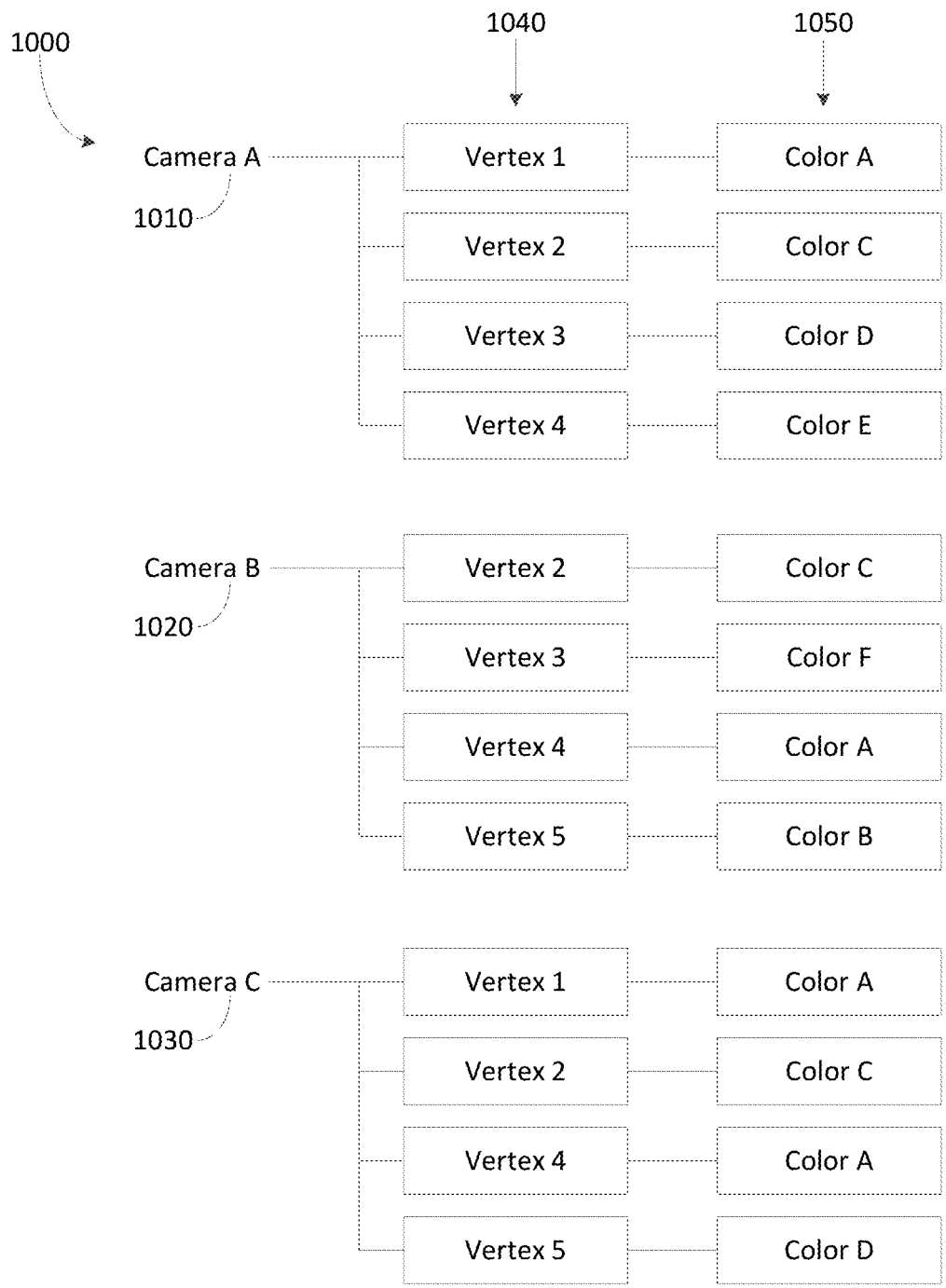
FIG. 10 is a diagram illustrating a data source-based display attribute determination method according to various embodiments.

FIG. 10 is a diagram illustrating a data source-based display attribute determination method 1000 according to various embodiments. Referring to FIGS. 1A-10, each of the Camera A 1010, Camera B 1020, and Camera C 1030 may be any suitable data source as described. Each of the cameras 1010-1030 may be configured (based on the camera pose associated therewith) to capture at least some of the vertices (shown in the vertices column 1040) in the model of the target spaced 105 as described. In the simplicity non-limiting example illustrated by FIG. 10, Camera A may be capture a frame having areas corresponding to each of vertex 1, vertex 2, vertex 3, and vertex 4 as shown in the vertices column 1040. Such method may be data source-based given that the weighting module 116 may determine the vertices associated with a given camera frame, perform graphic determination processes on the areas associated with the vertices captured by that camera frame, then move on to the next camera frame outputted by a different camera at the current frame time.

Through any suitable image processing methods, the weighting module 116 may be configured to determine display attributes (e.g., specific colors as shown in the display attribute column 1150) for a given display characteristic (e.g., color associated with the vertices) of an area on the frame (captured by Camera A 1010) associated with each of the vertices 1-4. For instance, vertex 1 may be determined to have the color A, vertex 2 may be determined to have the color C, vertex 3 may be determined to have the color D, and vertex 4 may be determined to have the color E.

Figure 11:
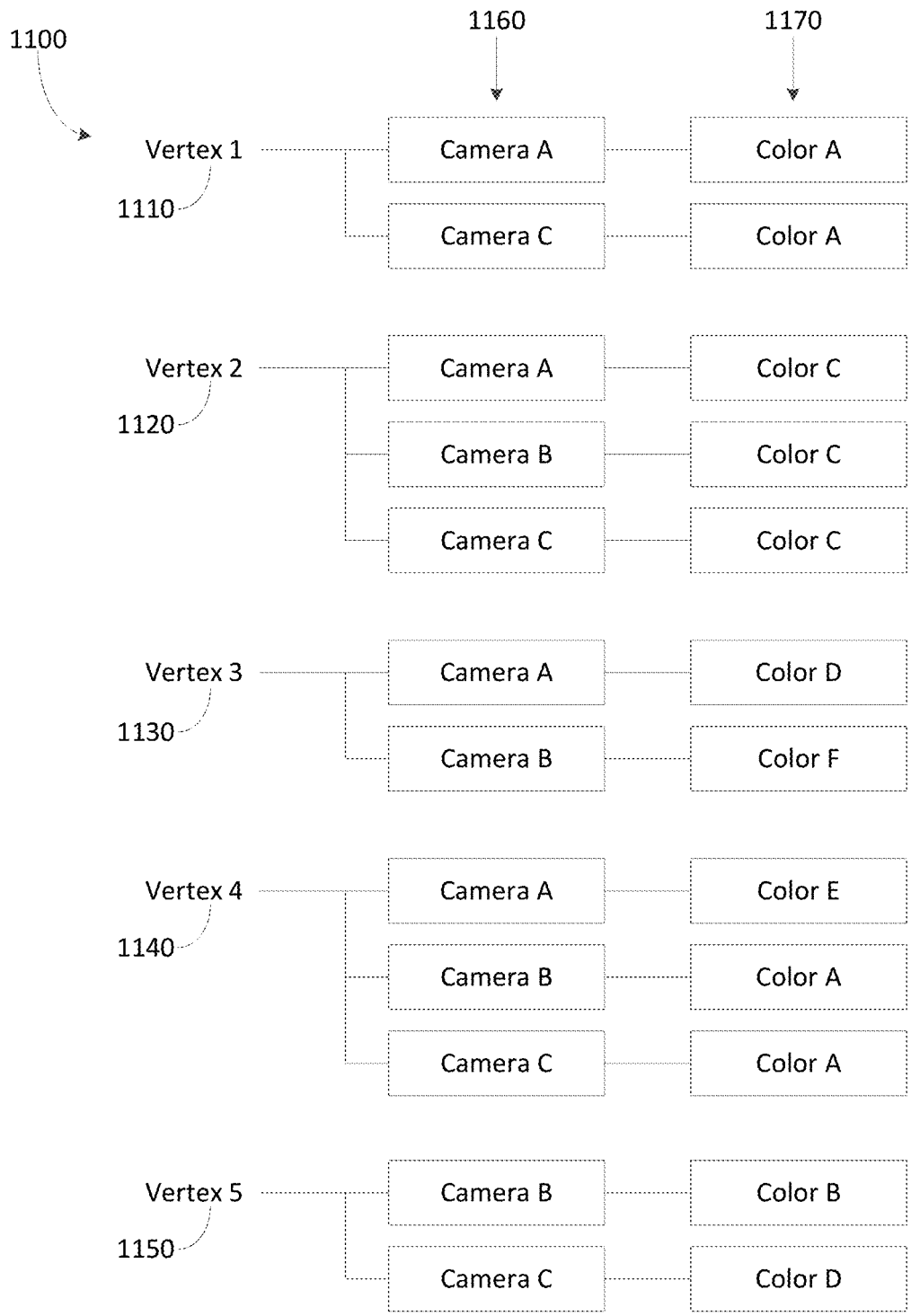
FIG. 11 is a diagram illustrating a vertex-based display attribute determination method according to various embodiments.

FIG. 11 is a diagram illustrating a vertex-based display attribute determination method 1100 according to various embodiments. Referring to FIGS. 1A-11, the vertex-based display attribute determination method 1100 may be an alternative method to the data source-based display attribute determination method 1000. Each of the in the camera column 1160 may be any suitable data source as described. Each of the vertex 1 1110, vertex 2 1120, vertex 3 1130, vertex 4 1140, and vertex 5 1150, may be any suitable vertices described herein.

For each of the vertices 1110-1150, the weighting module 116 may be configured to determine the cameras that capture the vertex. For example, the weighting module 116 may determine that Camera A and Camera C (in the camera column 1160) are associated with the vertex 1 1110. Through any suitable image processing methods, the weighting module 116 may be configured to determine display attributes (e.g., specific colors as shown in the display attribute column 1170) for a given display characteristic (e.g., color associated with the vertices) of an area on the frames (captured by Camera A and Camera C) associated with the vertex 1 1110. Both Camera A and Camera C may capture vertex 1 1110 in the color A.

FIG. 12 is an example of a weighting table 1200 implemented according to various embodiments. Referring to FIGS. 1A-12, the weighting table 1200 may correspond to the non-limiting example illustrated in either the data source-based display attribute determination method 1000 or the vertex-based display attribute determination method 1100. The weighting table 1200 illustrates a simplified example with respect the display characteristic of color.

For each of the vertices (e.g., vertex 1 1210, vertex 2 1220, vertex 3 1230, vertex 4 1240, and vertex 5 1250) a display attribute bin may be created to store display attributes captured corresponding each of the vertices in an array. As shown in the display attribute (color) bin column 1260, the Vertex 1 1210 may be captured only in Color A. The Vertex 3 1230 may be captured in Color D and Color F. For each display attribute captured for a given vertex, a weight bin is created, as shown in the weight bin column 1270. A weight bin stores weighting values for each of the display attributes captured. Each time a separate data source captures the vertex in a given display attribute, the weighting value for that display attribute is increased by a set amount (e.g., 1, in this case). For example, as shown in FIGS. 10-11, the Vertex 4 may be captured in Color A twice (e.g., by Camera B 1020 and Camera C 1030) and in Color E once (e.g., by Camera A 1010).

Based on the weighting values in the weighting bins as shown in the weight bin column 1270, one display attribute of the display attributes found in the display attribute bin shown in the display attribute column 1260 may be selected. In various embodiments, a threshold may be predetermined (in this specific example, display threshold weight=1), such that when the weight associated with a given display attribute exceeds (or equals to) the threshold, it is selected, e.g., by the job outcome determination module 117. For example, for Vertex 4 1240, the color A in the display attribute bin may be associated with a weight of 2, which exceeds the display threshold of 1. Thus, Color A is selected. On the other hand, where no display attribute in the display attribute bin exceeds the predetermined threshold, then no display attribute is selected (e.g., shown as "N/A," as in the cases of Vertex 3 1230 and Vertex 5 1250). This may be the case when the vertex is blocked by other objects or is within an object. In some embodiments, the vertices with unselected display attributes may be displayed at a default display attribute (e.g., background color). In other embodiments, the vertices with unselected display attributes may be assigned an average display attribute (e.g., an average color channel) within a predetermined number of vertices (e.g., surrounding vertices).

Figure 13:
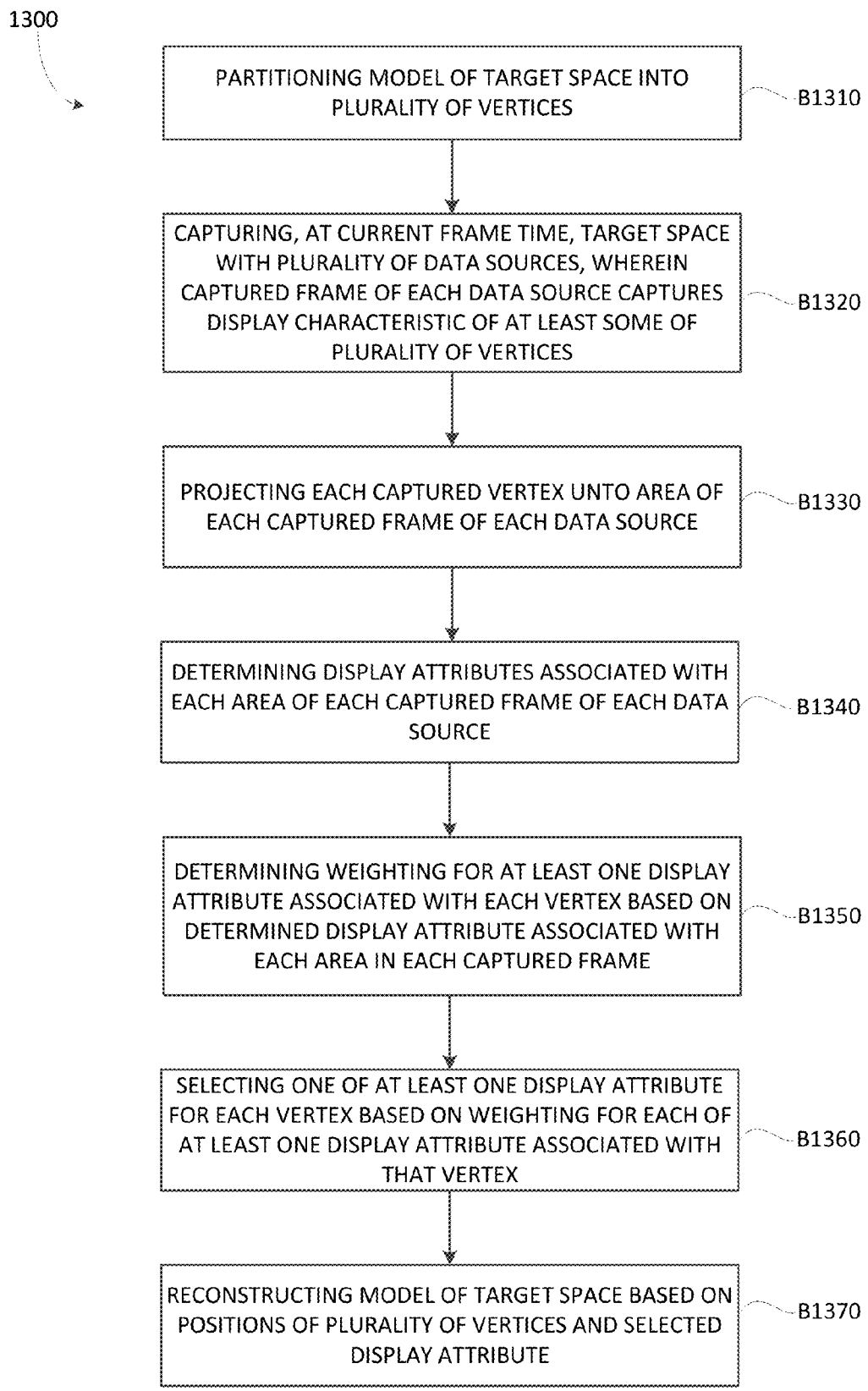
FIG. 13 is a process flowchart illustrating an example of a 3-dimensional model reconstruction process according to various embodiments.

FIG. 13 is a process flowchart illustrating an example of a 3-dimensional model reconstruction process 1300 according to various embodiments. Referring to FIGS. 1A-13, the 3-dimensional model reconstruction process 1300 may be particular implementations of the generalized 3-dimensional model reconstruction process 200. In particular, block B1310 may correspond to block B210, blocks B1320-B1350 may correspond to block B220, and blocks B1360 may correspond to block B230.

First at block B1310, the vertices determination module 115 of the backend device 110 may partition a model of a target space (e.g., any suitable target space described herein) into a plurality of vertices in a manner such as, but not limited to, block B210. In particular, each of the plurality of vertices may be associated with (e.g., positioned in a center of) a discrete volume which is a portion of the target space. In other embodiments, the partitioning may be executed by devices other than the backend device 110. In such cases, the model including the partitioned vertices (e.g., the positions of the vertices) may be imported to the backend device 110 or a remote server (to minimize data processed or stored by the backend device 110). The vertices may be partitioned in any suitable manner described.

Next at block B1320, data sources (e.g., any suitable data sources described herein) may capture, at a current frame time, the target space, such that a captured frame of each data source (at the current frame time) captures display characteristics of at least some of the plurality of vertices. In some embodiments, the data sources may output the captured data to a remote server storage/database or a CDN to minimize bottleneck at the backend device 110. In other embodiments, the output of the data sources may be relayed directly to the backend device 110

Next at block B 1330, for each captured frame (e.g., at the current frame time) of each of the data sources, the backend device 110 may project each captured vertex onto an area of each captured frame. In other embodiments, given the process-intensive nature of projections, the backend device 110 may outsource the projection processes to additional devices, such as web cores in the manner described with respect to "SYSTEMS AND METHODS FOR SCALABLE ASYNCHRONOUS COMPUTING FRAMEWORK" (application Ser. No. 14/537,768). The projection may project each vertex in the 3-dimensional model of the target space (e.g., having 3-dimensional coordinates) onto an area (a fraction of a pixel, at least one pixel, at least one macroblock, or the like) of each captured frame, which is 2-dimensional.

Next at block B1340, the weighting module 116 may determine display attribute associated with each area of each captured frame of each data source, for example, as a given frame time. In an example where the display characteristic is color, the backend device 110 may determine the color associated with each area of each captured frame. In other embodiments, the determination of the display attributes of the areas may be outsourced to web cores in the manner described with respect to "SYSTEMS AND METHODS FOR SCALABLE ASYNCHRONOUS COMPUTING FRAMEWORK" (application Ser. No. 14/537,768).

Next at block B1350, the weighting module 116 may determine weighting for at least one display attribute associated with each vertex based on the determined display attribute associated with each area in each captured frame (e.g., as described with respect to block B1340) in the manner described. In typical embodiments, an area of a captured frame may be analyzed to determine what is the display attribute being associated with it. The determined display attribute may indicate an increased weight for that determined display attribute associated with the vertex.

Next at block B1360, the job outcome determination module 117 may select one of the at least one display attribute for each vertex based on the weighting for each of the at least one display attribute associated with that vertex. In typical embodiments, the job outcome determination module 117 may select one of the at least one display attribute having its weighting exceeded a predetermine threshold.

Next at block B1370, the job outcome determination module 117 may reconstruct the model of the target space based on the positions of the plurality of vertices and the selected display attribute. The selected display attribute is assigned to its corresponding vertex, the position of which may be known.

As an alternative embodiment to blocks B1340-B1360, standard deviation of all display attributes observed for a given vertex may be determined. The average of the display attributes (e.g., an average of the color channel) may be chosen when the standard deviation is below a predetermined threshold. On the other hand, the vertex is observed to have different colors in a substantial number of data sources when the standard deviation of all observed display attributes is above a predetermined threshold. Thus, it is likely that the vertex may the interior of a volume in the target space 300 rather than a vertex associated with a color, and thus is assigned as null or an average of display attributes of surrounding vertices.

Figure 14:
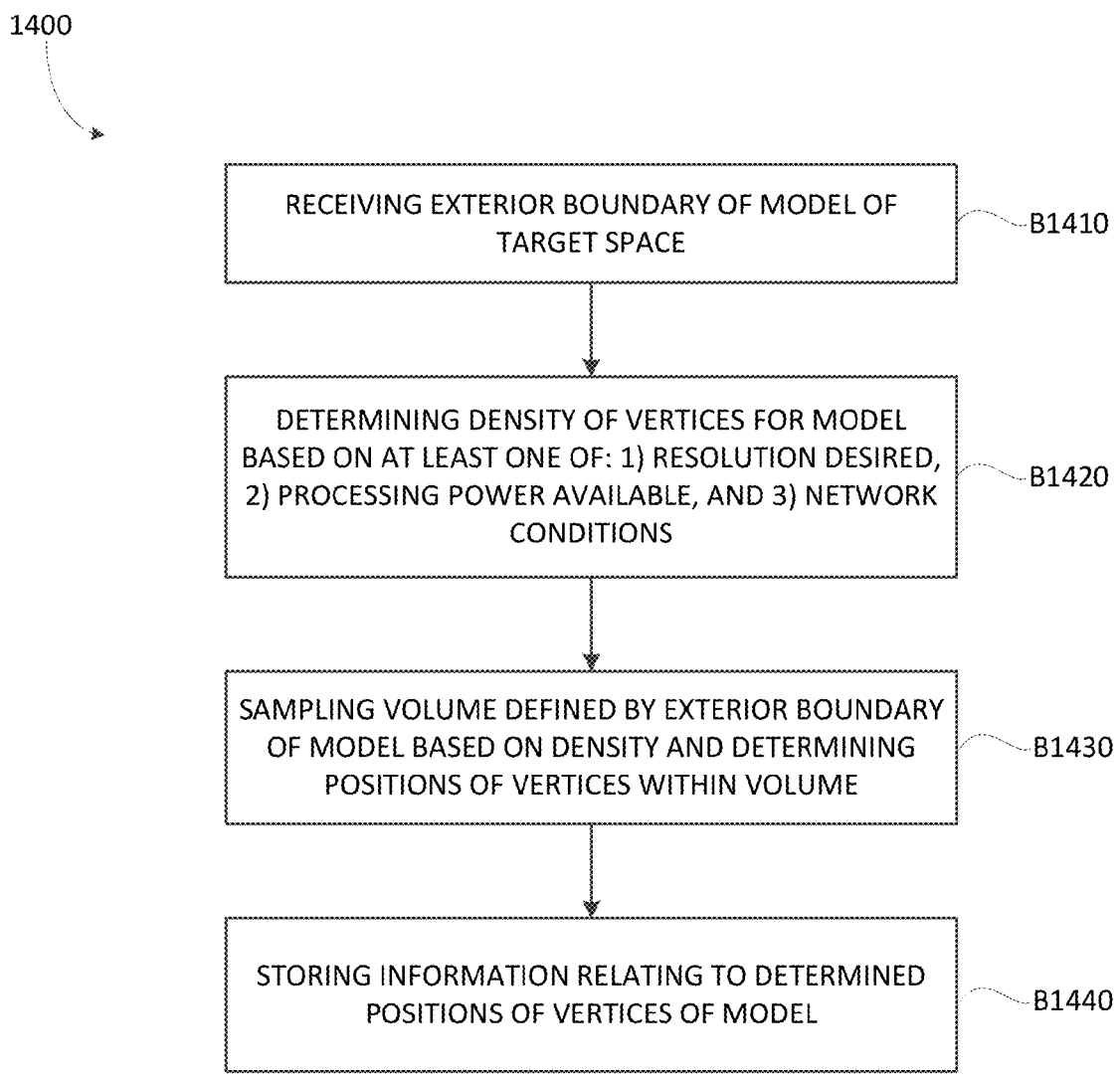
FIG. 14 is a process flowchart illustrating an example of a vertices partitioning process according to various embodiments.

FIG. 14 is a process flowchart illustrating an example of a vertices partitioning process 1400 according to various embodiments. Referring to FIGS. 1A-14, the vertices partitioning process 1400 may be particular implementations of blocks B210 and B1310. In some embodiments, the vertices partitioning process 1400 may be executed by the vertices determination module 115 in the backend device 110. In other embodiments, the vertices partitioning process 1400 may be executed by a device external to the backend device 110 (e.g., a processor connected to the backend device 110 via a suitable network) having the vertices determination module 115.

First at block B1410, the vertices determination module 115 may receive exterior boundary of a model of a target space. The model may be automatically generated based on scanner/camera outputs, manually by a user with a user interface (e.g., the user interface 114), a combination thereof, and/or the like. In some embodiments, the exterior boundary may be generated by the device (e.g., the backend device 110 or another device) having the vertices determination module 115, or another device that generates the exterior boundary of the model.

Next at block B1420, the vertices determination module 115 may determine density of the vertices for the model based on at least one of 1) resolution desired, 2) processing power available, and 3) network conditions. The denser vertices may be selected when higher resolution is desired, more processing power is available, and/or better network conditions (e.g., network bandwidth and congestion) are present, vice versa. The resolution may be set manually via the user interface 114 of the backend device 110 or through any other device. In addition, the resolution may also be a function of processing power and network conditions (e.g., higher resolution may be associated with more processing power being available and/or better network conditions being present. The processing power available may refer to the processing capabilities of the backend device 110 (e.g., the processor 111) or the distributed computing framework as set forth in "SYSTEMS AND METHODS FOR SCALABLE ASYNCHRONOUS COMPUTING FRAMEWORK" (application Ser. No. 14/537,768). The network conditions may refer to the bandwidth/usage of the network 130 or other networks involved in transmitting data used in the processes described herein.

Next at block B1430, the vertices determination module 115 may sample a volume defined by the exterior boundary of the model based on the density, and determine positions of vertices in the volume defined by the exterior boundary of the model. The higher the density, the closer together the vertices are, and the smaller the discrete volume associated with each vertex is. In some embodiments, the volume may be divided into two or more regions, where a first region (e.g., a region of interest where a lot of activities are occurring in the target space) may have a first (higher) density while a second region (e.g., a relatively uneventful region) may have a second (lower) density.

It should be noted by one having ordinary skill in the art that the density determination block B1420 and the sampling block B1430 may be reiterated when the resolution desired, the processing power available, and the network conditions are altered once the initial sampling took place. In some embodiments, when the fluctuation to these elements exceed a threshold, the vertices determination module 115 may re-execute blocks B1420 and B1430 for adjustment.

Next at block B1440, the vertices determination module 115 may store information relating to the determined positions of vertices of the model in the memory 112, the database 170, or another remote storage/database to be accessed (e.g., for projections and selecting display characteristics/attributes).

Figure 15:
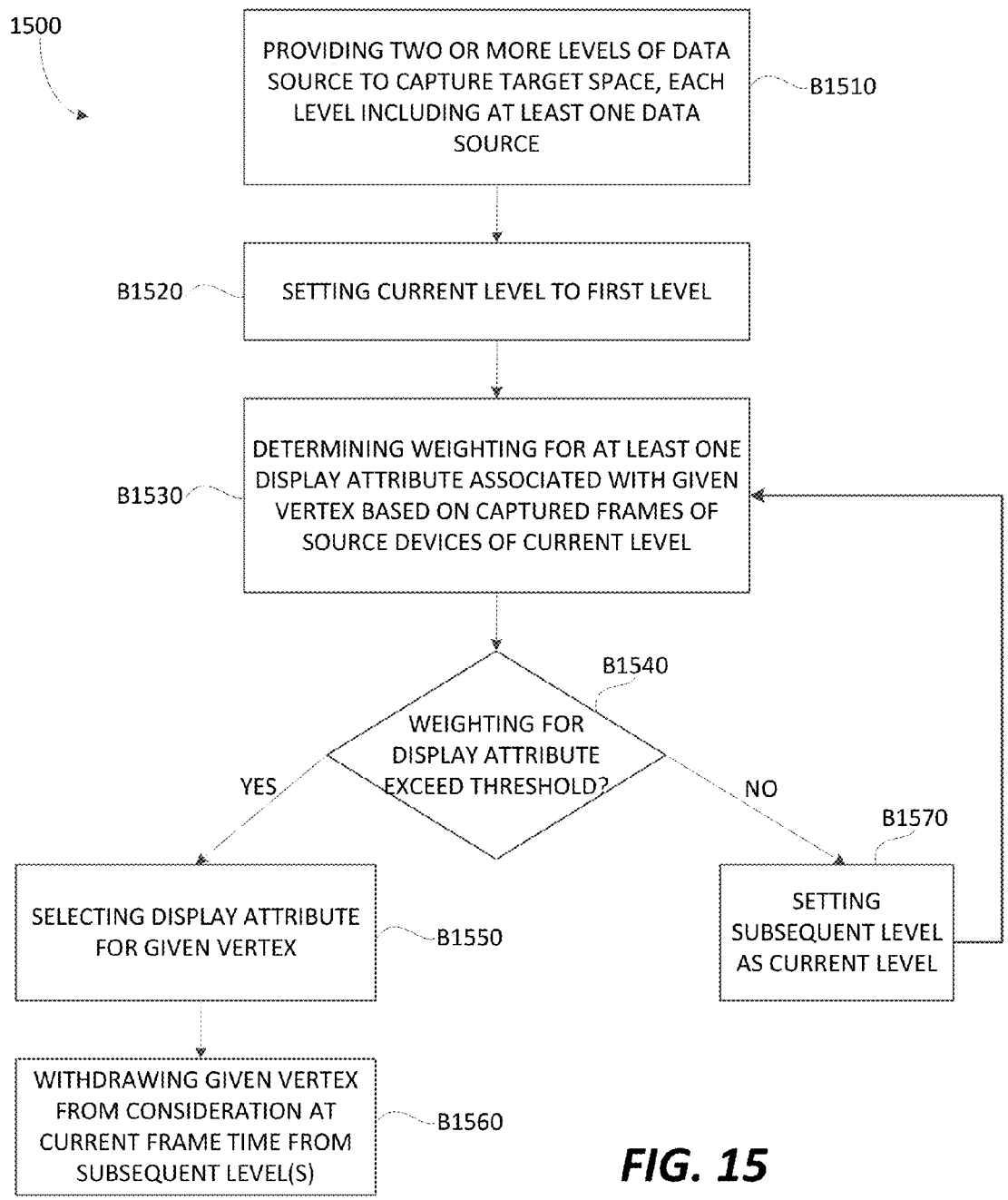
FIG. 15 is a process flowchart illustrating an example of a level-focused weighting process according to various embodiments.

FIG. 15 is a process flowchart illustrating an example of a level-focused weighting process 1500 according to various embodiments. Referring to FIGS. 1A-15, the level-focused weighting process 1500 may be particular implementations of blocks B220 and B1340/B1350. In some embodiments, the level-focused weighting process 1500 may be executed by the weighting module 116 in the backend device 110. In other embodiments, the level-focused weighting process 1500 may be executed by a device external to the backend device 110 (e.g., a processor connected to the backend device 110 via a suitable network) having the weighting module 116.

First at block B1510, two or more levels of data sources may be provided to capture the target space, where each level may include at least one data source. The levels of data sources may be provided in a manner such as, but not limited to, described with respect to FIG. 8A. Next at block B1520, the weighting module 116 may set the current level as a first level.

Subsequently at block B1530, the weighting module 116 may determine weighting for at least one display attribute associated with a given vertex based on captured frames of source devices of current level. In other words, the source devices of the current level (which may be the first level initially, and other levels subsequently) may output a captured frame each, and each captured frame may include an area corresponding to the given vertex. A display attribute of a display characteristic may be extracted from the area and added to the weighting bin in the manner described. With respect to the given vertex, weighting bins corresponding to each captured display attribute may be developed, where the weighting bins may include the display attributes and weighting based on the captured frames of the current level of data sources.

Next at block B1540, the weighting module 116 may determine whether the weighting of one of the at least one display attribute captured by the data sources of the current level exceeds a predetermined threshold. When the weighting of one display attribute exceeds the predetermined threshold, sufficient confidence may be established that the vertex is associated with that display attribute. Thus, at block B1550 (B1540:YES), the display attribute having weightings exceeding the predetermined threshold may be selected for the given vertex. The selected display attribute may be stored in the selected display attribute bin 1280. Subsequently at block B1560, the weighting module 116 may withdraw the given vertex from consideration at the current frame time. In other words, the given vertex is withdraw from processing at subsequent levels (involving additional data sources) in the same frame time.

On the other hand, whereas none of the weightings for the at least one display attribute observed by the current level of data sources exceed the predetermined threshold, the weighting module 116 may set a subsequent level as the current level at block B1570 (B1540:NO), and the process returns to block B1530. At block B1570, the selected display attribute may be set as void or as an average of display attributes of surrounding vertices when there are no more subsequent levels of data sources.

One of ordinary skills in the art would appreciate that the weighting threshold may be altered as the process advances to a subsequent level (at block B1570). For example, where there are 10 data sources in a first level, the threshold may be set to be 5 (to assure that only one display attribute could potentially exceed the threshold). When there are additional 10 data sources in a second level, the threshold for the second level may be set to be 10. The example assumes increasing the weighting by 1 every time a display attribute is captured.

In addition to the level-focused weighting process 1500 which seeks to withdraw vertices from consideration with respect to subsequent levels, the weighting module 116 may employ heuristic methods to further reduce the number of vertices (the corresponding areas on frames) to be processed for each frame time by discarding vertices known to require little to no processing.

For example, a mask-based on motion can be used to discard vertices that are not in the volumes of interest in the target space. The volume of interest may refer to a particular region (e.g., the field where the players are playing, rather than the stands) of special processing interest. In some embodiments, volume of interest may be particular volumes where static objects are located. For example, the weighting module 116 may access display attribute bins 1260, the weight bins 1270, and the selected display attribute bin 1280 for a given vertex for previous frame times. The weighting for a display attribute associated with the given vertex of the current frame may be further modified by the selected display attributes (as stored in the selected display attribute bin 1280) for previous frame times. For example, the weight for each display attribute may be modified by a constant multiplied by a number of times that the display attribute has been selected for the vertex previously (e.g., for previous frame times). As such, the processes described herein may quickly pass over vertices that are commonly static and would have the same display attribute for this frame time as the previous frame times.

Figure 16:
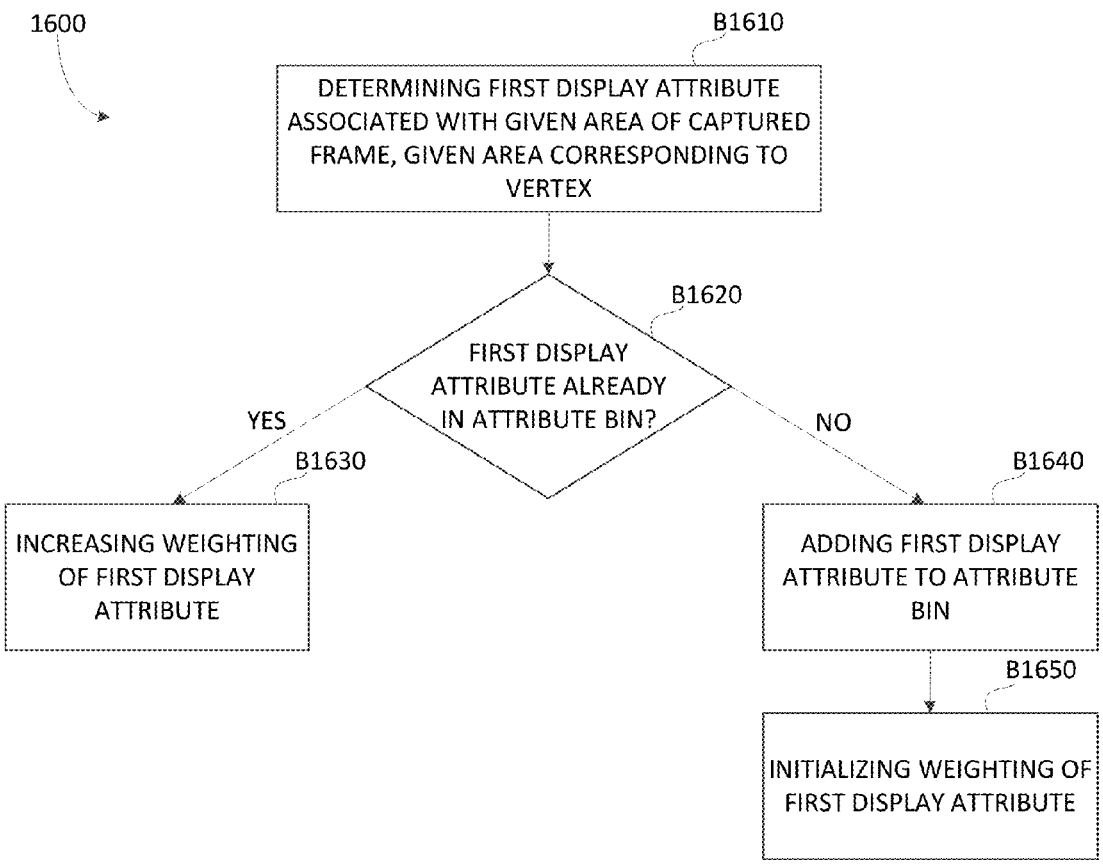
FIG. 16 is a process flowchart illustrating an example of a weighting process according to various embodiments.

FIG. 16 is a process flowchart illustrating an example of a weighting process 1600 according to various embodiments. Referring to FIGS. 1A-16, the weighting process 1600 may be particular implementations of blocks B220, B1350, and B1530. In some embodiments, the weighting process 1600 may be executed by the weighting module 116 in the backend device 110. In other embodiments, the weighting process 1600 may be executed by a device external to the backend device 110 (e.g., a processor connected to the backend device 110 via a suitable network) having the weighting module 116.

First at block B1610, the weighting module 116 may determine a first display attribute associated with a given area of a captured frame, the given area corresponding to a vertex defined in the model of the target space. In a non-limiting example (where the display characteristic is color), the weighting module 116 may determine that a color coded "b65e6f" may be associated with a first area of a captured frame of a first data source. The weighting module 116 may then retrieve storage bins (e.g., the display attribute bin 1260, the weight bin 1270, and/or the like) for the vertex associated with the first area.

Next at block B1620, the weighting module 116 may determine whether the first display attribute (e.g., the color b65e6f) has a display attribute bin 1260 associated with the first display attribute. At block B1630 (B1620:YES), whereas a display attribute bin 1260 is already created, the weighting module 116 may increase the weighting of the first display attribute by a predetermined amount (e.g., 1). The weighting module 116 may store the updated weighting into the display attribute bin 1260.

On the other hand, at block B1640 (B1620:NO), the weighting module 116 may a new display attribute bin 1260 corresponding to the first display attribute. Then, the weighting module 116 may initialize weighting of the first display attribute at block B1650 by, for example, increasing the weighting of the first display attribute by a predetermined amount (e.g., 1) and storing the updated weighting into the newly created display attribute bin 1260.

Various embodiments described above with reference to FIGS. 1A-16 include the performance of various processes or tasks. In various embodiments, such processes or tasks may be performed through the execution of computer code read from computer-readable storage media. For example, in various embodiments, one or more computer-readable storage mediums store one or more computer programs that, when executed by a processor cause the processor to perform processes or tasks as described with respect to the processor in the above embodiments. Also, in various embodiments, one or more computer-readable storage mediums store one or more computer programs that, when executed by a device, cause the computer to perform processes or tasks as described with respect to the devices mentioned in the above embodiments. In various embodiments, one or more computer-readable storage mediums store one or more computer programs that, when executed by a database, cause the database to perform processes or tasks as described with respect to the database in the above embodiments.

Thus, embodiments include program products including computer-readable or machine-readable media for carrying or having computer or machine executable instructions or data structures stored thereon. Such computer-readable storage media can be any available media that can be accessed, for example, by a general purpose or special purpose computer or other machine with a processor. By way of example, such computer-readable storage media can include semiconductor memory, flash memory, hard disks, optical disks such as compact disks (CDs) or digital versatile disks (DVDs), magnetic storage, random access memory (RAM), read only memory (ROM), and/or the like. Combinations of those types of memory are also included within the scope of computer-readable storage media. Computer-executable program code may include, for example, instructions and data which cause a computer or processing machine to perform certain functions, calculations, actions, or the like.

The embodiments disclosed herein are to be considered in all respects as illustrative, and not restrictive. The present disclosure is in no way limited to the embodiments described above. Various modifications and changes may be made to the embodiments without departing from the spirit and scope of the disclosure. Various modifications and changes that come within the meaning and range of equivalency of the claims are intended to be within the scope of the disclosure.

What is claimed is:

1. A method comprising:
    partitioning a model of a target space into a plurality of vertices;
    determining two or more display attributes associated with each of at least one of the plurality of vertices based on output data provided by a plurality of data sources, wherein each of the two or more display attributes is captured by at least one data source of plurality of data sources, the at least one data source being a different data source relative to each data source that captures each of the other display attributes of the two or more display attributes; and
    selecting one of the two or more display attributes for each of the at least one of the plurality of vertices;
    wherein the one of the two or more display attributes is selected based on weights associated with each of the two or more display attributes; and
    wherein the weights associated with each of the two or more display attributes are based on a number of the plurality of data sources capturing each of the two or more display attributes.

2. The method of claim 1, further comprising providing a plurality of data sources, each of the plurality of data sources output data corresponding to a current frame as the output data comprising a plurality of areas.

3. The method of claim 2, wherein each of the plurality of areas corresponds to one of the plurality of vertices.

4. The method of claim 3, wherein determining the at least one display attribute associated with each of the plurality of vertices comprises determining a display attribute associated with each of the plurality of areas of the current frame for each of the plurality of data sources.

5. The method of claim 2, wherein each of the plurality of data sources provides the output data corresponding to at least some of the plurality of vertices.

6. The method of claim 5, wherein each of the plurality of data sources comprises at least one digital video camera arranged at a camera position and orientation that is different from the camera position and orientation of another one of the plurality of data sources.

7. The method of claim 5, wherein the output data corresponding to at least one of the plurality of vertices is outputted by two or more of the plurality of data sources.

8. The method of claim 2, wherein:
the plurality of data sources are arranged in two or more levels; and
the at least one display attribute for a first vertex of the plurality of vertices is determined based on the output data outputted by the at least one of the plurality of data sources in a first level of the two or more levels.

9. The method of claim 1, further comprising projecting at least one of the plurality of vertices onto one of the plurality of areas.

10. The method of claim 1, wherein partitioning a model of a target space into a plurality of vertices comprises:
receiving an exterior boundary of the model of the target space;
determining density of the plurality of vertices; and
sampling a volume defined by the exterior boundary of the model based on the density of the plurality of vertices.

11. The method of claim 10, wherein the density of the plurality of vertices is determined based on at least one of resolution desired, processing power available, and network conditions.

12. The method of claim 1, wherein the target space is a 3-dimensional space.

13. The method of claim 1, wherein the output data comprises one or more of an image or video frame.

14. The method of claim 1, wherein:
the at least one display attribute comprises two or more colors; and
selecting one of the at least one display attribute for each of the plurality of vertices comprises selecting one of the two or more colors for each of the plurality of vertices.

15. The method of claim 1, wherein the at least one display attribute is at least one of a texture, frequency transform, wavelet transform, average, or standard deviation.

16. The method of claim 1, wherein:
the model of the target space comprises at least one object; and
the model of the target space is partitioned based on a size of discrete volumes making up an overall volume of the model of the target space.

17. The method of claim 1, wherein determining the two or more display attributes associated with each of the at least one of the plurality of vertices based on the output data provided by the plurality of data sources comprises:
determining a first display attribute of the two or more display attributes associated one of the at least one of the plurality of vertices based on first output data provided by a first data source of the plurality of data sources; and
determining a second display attribute of the two or more display attributes associated the one of the at least one of the plurality of vertices based on second output data provided by a second data source of the plurality of data sources; and
wherein selecting the one of the two or more display attributes comprises selecting one of the first display attribute and the second display attribute.

18. A method comprising:
partitioning a model of a target space into a plurality of vertices;
determining two or more display attributes associated with each of at least one of the plurality of vertices based on output data provided by a plurality of data sources, wherein each of the two or more display attributes is captured by at least one data source of plurality of data sources, the at least one data source being a different data source relative to each data source that captures each of the other display attributes of the two or more display attributes;
selecting one of the two or more display attributes for each of the at least one of the plurality of vertices; and
providing a plurality of data sources, each of the plurality of data sources output data corresponding to a current frame as the output data comprising a plurality of areas;
wherein the plurality of data sources are arranged in two or more levels; and
wherein the at least one display attribute for a first vertex of the plurality of vertices is determined based on the output data outputted by the at least one of the plurality of data sources in a first level of the two or more levels; and
wherein the at least one display attribute for the plurality of vertices other than the first vertex is determined based on the output from the plurality of data sources associated with levels other than the first level when a weight associated with one of the at least one display attribute for the first vertex exceeds a predetermined threshold.

19. A method comprising:
partitioning a model of a target space into a plurality of vertices;
determining two or more display attributes associated with each of at least one of the plurality of vertices based on output data provided by a plurality of data sources, wherein each of the two or more display attributes is captured by at least one data source of plurality of data sources, the at least one data source being a different data source relative to each data source that captures each of the other display attributes of the two or more display attributes;
selecting one of the two or more display attributes for each of the at least one of the plurality of vertices; and
providing a plurality of data sources, each of the plurality of data sources output data corresponding to a current frame as the output data comprising a plurality of areas;
wherein the plurality of data sources are arranged in two or more levels; and
wherein the at least one display attribute for a first vertex of the plurality of vertices is determined based on the output data outputted by the at least one of the plurality of data sources in a first level of the two or more levels; and
wherein the at least one display attribute for the first vertex is determined based on the output data outputted by the at least one of the plurality of data sources associated with a second level of the two or more levels when the weights associated with any of the at least one display attribute is equal to or less than a predetermined threshold.

20. An apparatus, the apparatus configured to:
partition a model of a target space into a plurality of vertices;
determine two or more display attributes associated with each of at least one of the plurality of vertices based on output data observed by a plurality of data sources, wherein each of the two or more display attributes is captured by at least one data source of plurality of data sources, the at least one data source being a different data source relative to each data source that captures each of the other display attributes of the two or more display attributes; and
select one of the two or more display attributes for each of the at least one of the plurality of vertices;
wherein the one of the two or more display attributes is selected based on weights associated with each of the two or more display attributes; and
wherein the weights associated with each of the two or more display attributes are based on a number of the plurality of data sources capturing each of the two or more display attributes.

21. The apparatus of claim 20, wherein the apparatus is further configured to provide a plurality of data sources, each of the plurality of data sources output data corresponding to a current frame as the output data comprising a plurality of areas.

22. The apparatus of claim 21, wherein each of the plurality of areas corresponds to one of the plurality of vertices.

23. The apparatus of claim 22, wherein determining the at least one display attribute associated with each of the plurality of vertices comprises determining a display attribute associated with each of the plurality of areas of the current frame for each of the plurality of data sources.

24. The apparatus of claim 21, wherein each of the plurality of data sources provides the output data corresponding to at least some of the plurality of vertices.

25. The apparatus of claim 24, wherein: each of the plurality of data sources comprises at least one digital video camera arranged at a camera position and orientation that is different from the camera position and orientation of another one of the plurality of data sources.

26. A non-transitory computer-readable storage medium storing program instructions that, when executed, causes a processor to:
partition a model of a target space into a plurality of vertices;
determine two or more display attributes associated with each of at least one of the plurality of vertices based on output data observed by a plurality of data sources, wherein each of the two or more display attributes is captured by at least one data source of plurality of data sources, the at least one data source being a different data source relative to each data source that captures each of the other display attributes of the two or more display attributes; and
select one of the two or more display attributes for each of the at least one of the plurality of vertices;
wherein the one of the two or more display attributes is selected based on weights associated with each of the two or more display attributes; and
wherein the weights associated with each of the two or more display attributes are based on a number of the plurality of data sources capturing each of the two or more display attributes.

* * * * *